United States Patent
Clement et al.

(10) Patent No.: US 11,002,368 B2
(45) Date of Patent: May 11, 2021

(54) VALVE ASSEMBLY WITH EQUAL PERCENTAGE FLOW CONTROL

(71) Applicant: Johnson Controls Technology Company, Milwaukee, WI (US)

(72) Inventors: Bernard P. Clement, Mequon, WI (US); Brian D. Klarkowski, Wauwatosa, WI (US); Duane S. Freimuth, Franklin, WI (US); Kevin A. Weiss, Gurnee, IL (US); Russell T. Jenks, Racine, WI (US); Kyle M. Bero, Milwaukee, WI (US); Nicholas P. Prato, Milwaukee, WI (US); Gary A. Romanowich, Slinger, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/716,947

(22) Filed: Sep. 27, 2017

(65) Prior Publication Data
US 2018/0094733 A1    Apr. 5, 2018

Related U.S. Application Data

(60) Provisional application No. 62/404,636, filed on Oct. 5, 2016, provisional application No. 62/508,086, filed on May 18, 2017.

(51) Int. Cl.
*F16K 5/06* (2006.01)
*F16K 11/087* (2006.01)
(Continued)

(52) U.S. Cl.
CPC ........ *F16K 5/0605* (2013.01); *B25B 27/0028* (2013.01); *F16K 5/08* (2013.01);
(Continued)

(58) Field of Classification Search
USPC .................................................... 137/625.47
See application file for complete search history.

(56) References Cited

U.S. PATENT DOCUMENTS 1,807,900 A    6/1931   Dougherty
3,254,669 A    6/1966   Perlman
(Continued)

FOREIGN PATENT DOCUMENTS

CN    1074988 A    8/1993
CN    1432748 A    7/2003
(Continued)

OTHER PUBLICATIONS

Extended Search Report for European Application No. 17194412.7, dated Feb. 20, 2018, 8 pages.
(Continued)

*Primary Examiner* — Craig J Price
(74) *Attorney, Agent, or Firm* — Foley & Lardner LLP

(57) ABSTRACT

A valve assembly is provided. The valve assembly includes a valve body having a valve chamber and a plurality of ports into the valve chamber. The plurality of ports include a first port, a second port, and a third port. The first port and the second port are aligned with a common axis and located on opposite sides of the valve chamber. The system further includes a valve member located within the valve chamber. The valve member is a rotatable ball having a fluid passage that extends through the ball and includes an opening at the end of the ball. The fluid passage is substantially oval-shaped when viewed at the opening in a direction parallel to the fluid passage. The valve assembly further includes a valve stem that is coupled to a valve member and has a first end that extends from the valve body.

11 Claims, 23 Drawing Sheets

(51) Int. Cl.
*F16K 5/08* (2006.01)
*B25B 27/00* (2006.01)
*F16K 37/00* (2006.01)
*B29L 31/00* (2006.01)
*F16K 31/04* (2006.01)
*F16L 47/02* (2006.01)

(52) U.S. Cl.
CPC ...... *F16K 11/0873* (2013.01); *F16K 11/0876* (2013.01); *F16K 37/0008* (2013.01); *B29K 2995/002* (2013.01); *B29L 2031/7506* (2013.01); *F16K 31/041* (2013.01); *F16L 47/02* (2013.01); *Y10T 137/6109* (2015.04); *Y10T 137/6113* (2015.04)

(56) References Cited

U.S. PATENT DOCUMENTS

| | | | |
|---|---|---|---|
| 3,998,108 A | 12/1976 | Vyskocil | |
| 4,135,838 A | 1/1979 | Vandenberg | |
| 4,887,634 A | 12/1989 | Killian | |
| 4,968,334 A * | 11/1990 | Hilton | B01D 53/0407 137/625.32 |
| 5,240,030 A | 8/1993 | Wang | |
| 5,592,965 A | 1/1997 | Rakieski | |
| 6,035,885 A | 3/2000 | Schuessler et al. | |
| 6,880,806 B2 | 4/2005 | Haikawa et al. | |
| 7,131,635 B2 | 11/2006 | Oh | |
| 7,506,665 B2 | 3/2009 | Gruener, Sr. | |
| 8,666,584 B2 | 3/2014 | Allgaier et al. | |
| 8,733,735 B2 | 5/2014 | Strebe | |
| 8,783,657 B2 | 7/2014 | Yang et al. | |
| 8,789,807 B2 | 7/2014 | Kreuter | |
| 8,967,196 B2 | 3/2015 | Ha et al. | |
| 9,052,019 B2 | 6/2015 | Ma | |
| 9,964,226 B2 | 5/2018 | Scaramucci et al. | |
| 9,964,329 B2 * | 5/2018 | Whitmore | F16K 11/0873 |
| 2005/0127317 A1 | 6/2005 | Rebello | |
| 2006/0096644 A1 * | 5/2006 | Goldfarb | F16K 11/085 137/625.47 |
| 2006/0097214 A1 | 5/2006 | Rebello | |
| 2006/0162792 A1 * | 7/2006 | Oh | F16K 5/0605 137/625.41 |
| 2007/0252015 A1 | 11/2007 | Norris et al. | |
| 2009/0240376 A1 * | 9/2009 | Elshafei | G05D 7/0635 700/282 |
| 2010/0018399 A1 * | 1/2010 | Barone | B01D 53/0446 96/122 |
| 2010/0263618 A1 | 10/2010 | Keefover et al. | |
| 2011/0048556 A1 * | 3/2011 | Carter | F16K 31/122 137/559 |
| 2012/0119131 A1 | 5/2012 | Strebe | |
| 2013/0198073 A1 | 8/2013 | Amann et al. | |
| 2013/0263949 A1 | 10/2013 | Bartnick et al. | |
| 2014/0231690 A1 | 8/2014 | Vincent et al. | |
| 2014/0277764 A1 * | 9/2014 | Burt | G05B 15/02 700/276 |
| 2015/0226343 A1 | 8/2015 | Jenks | |
| 2015/0308576 A1 | 10/2015 | Yelkin et al. | |
| 2016/0010536 A1 | 1/2016 | Murakami et al. | |
| 2016/0097403 A1 | 4/2016 | Russell et al. | |
| 2017/0321815 A1 | 11/2017 | Vuichard et al. | |
| 2018/0073684 A1 | 3/2018 | Ikeda | |

FOREIGN PATENT DOCUMENTS

| | | |
|---|---|---|
| CN | 201137713 Y | 10/2008 |
| CN | 201225412 Y | 4/2009 |
| CN | 101482189 A | 7/2009 |
| CN | 100587302 C | 2/2010 |
| CN | 204573159 U | 8/2015 |
| CN | 204803971 U | 11/2015 |
| CN | 205534357 U | 8/2016 |
| CN | 105963823 A | 9/2016 |
| EP | 1672261 | 6/2006 |
| EP | 2006586 | 12/2008 |
| GB | 1215159 | 12/1970 |
| JP | S61-116179 | 6/1986 |
| WO | WO 2012/001552 | 1/2012 |
| WO | WO-2016/152609 A1 | 9/2016 |

OTHER PUBLICATIONS

Extended Search Report for European Application No. 17194435.8, dated Feb. 19, 2018, 8 pages.
Extended Search Report for European Application No. 17194450.7, dated Feb. 19, 2018, 8 pages.
Foreign Action other than Search Report on EP 17194412.7 dated Aug. 27, 2019.
Office Action on EP 17194412.7, dated Apr. 8, 2020, 4 pages.
Third Chinese Office Action for Application No. CN 201710928469.5 dated Dec. 28, 2020, 26 pages with English machine translation.

* cited by examiner

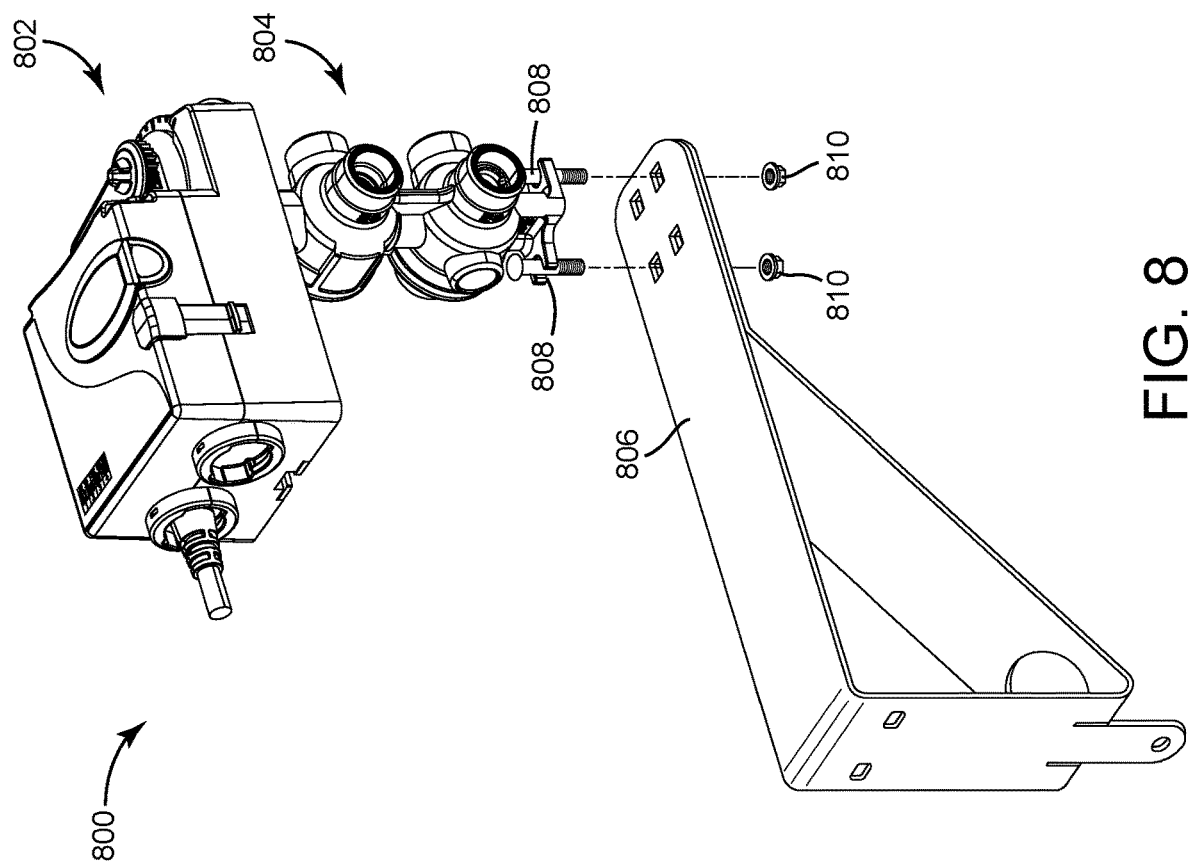
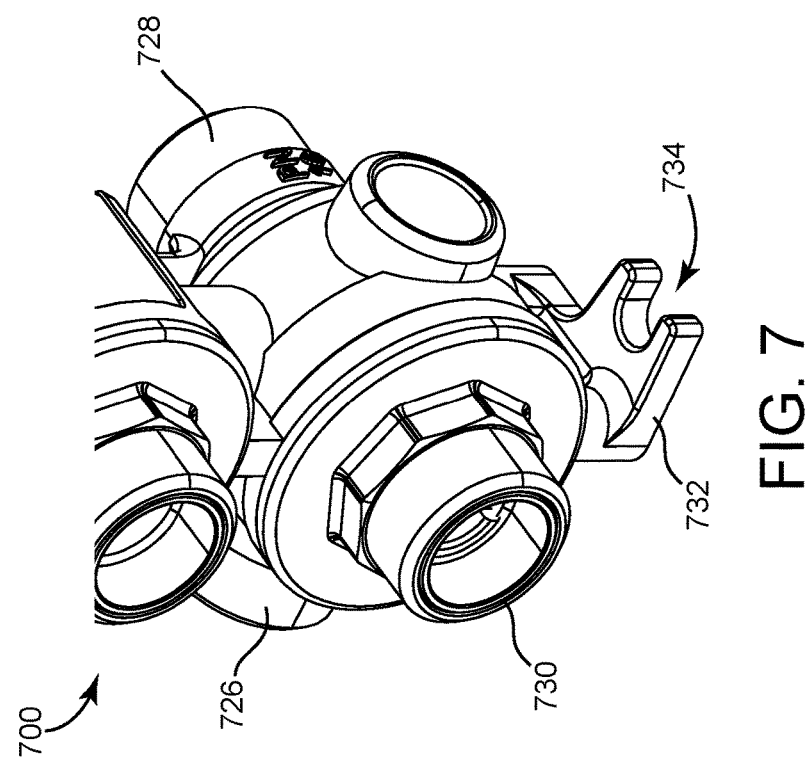
FIG. 8
FIG. 7

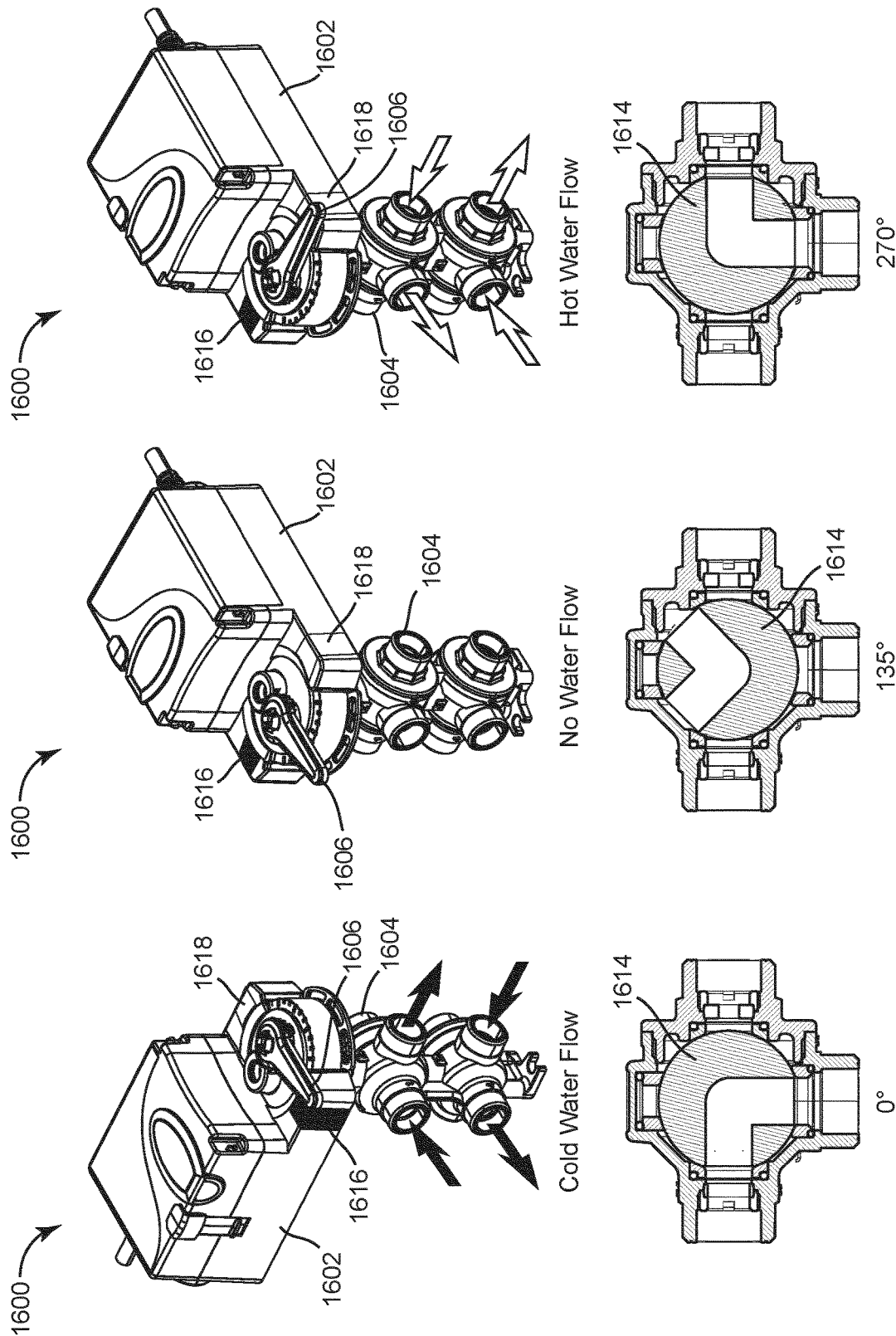

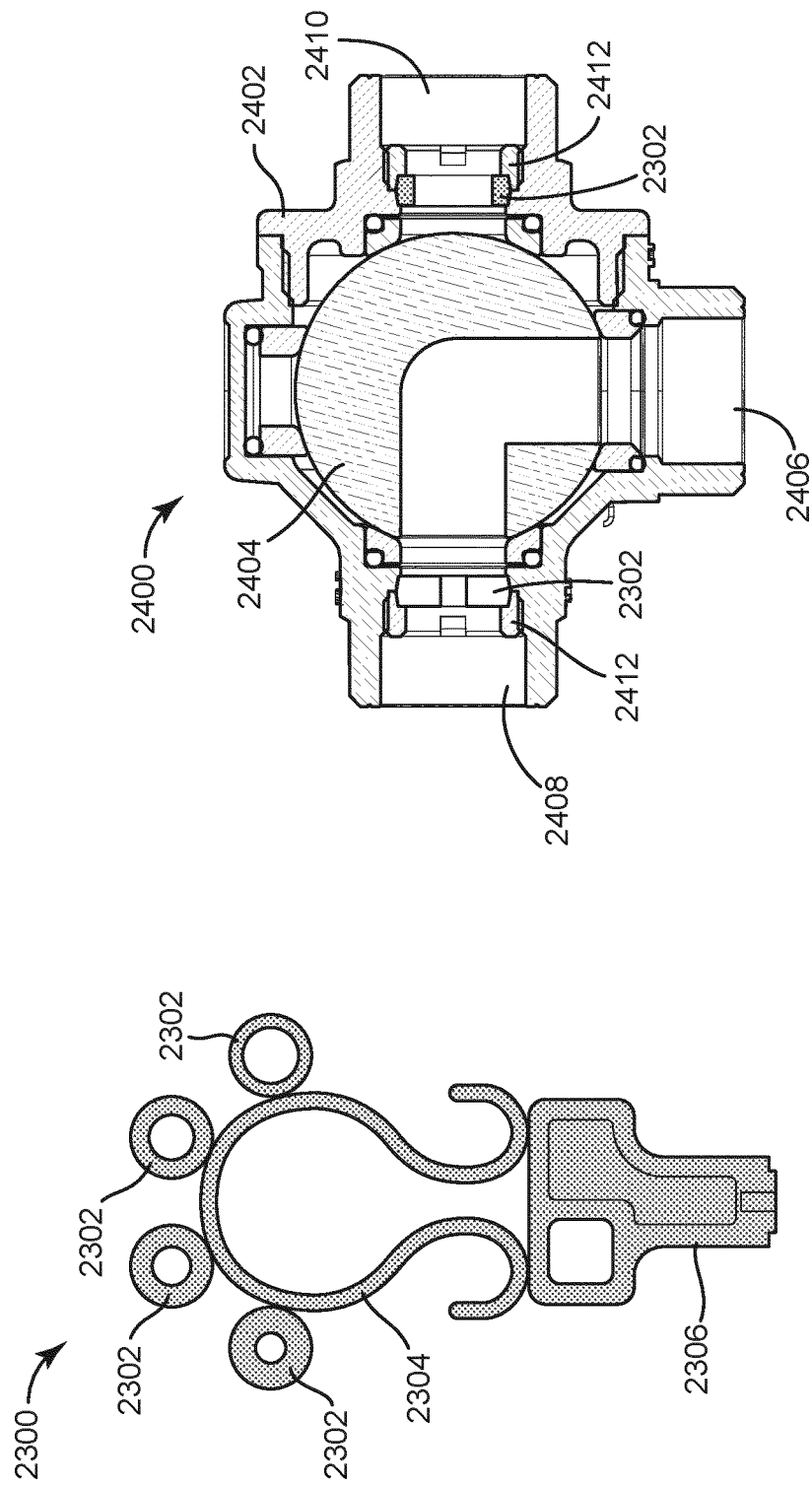

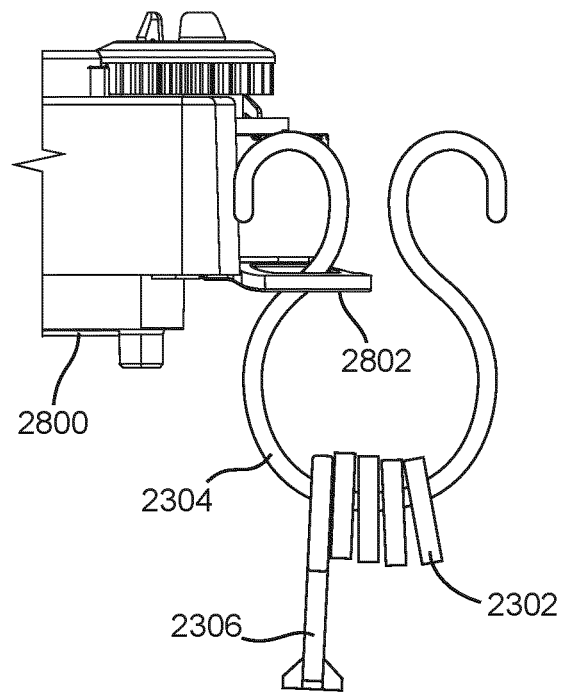
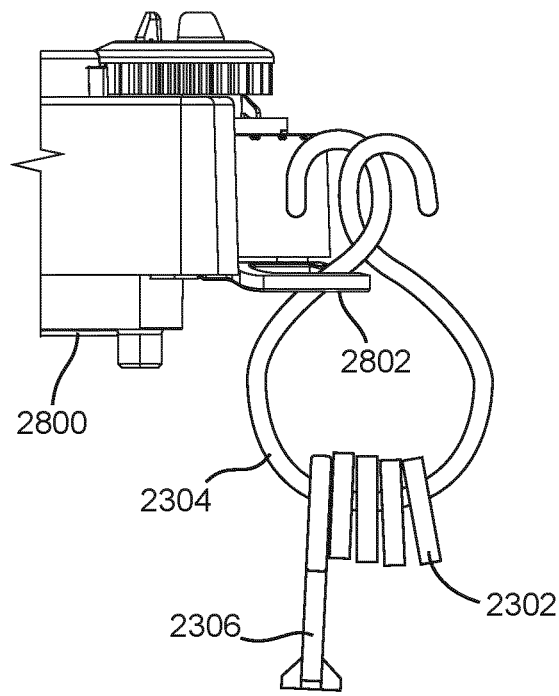
FIG. 28　　　　　　　　FIG. 29
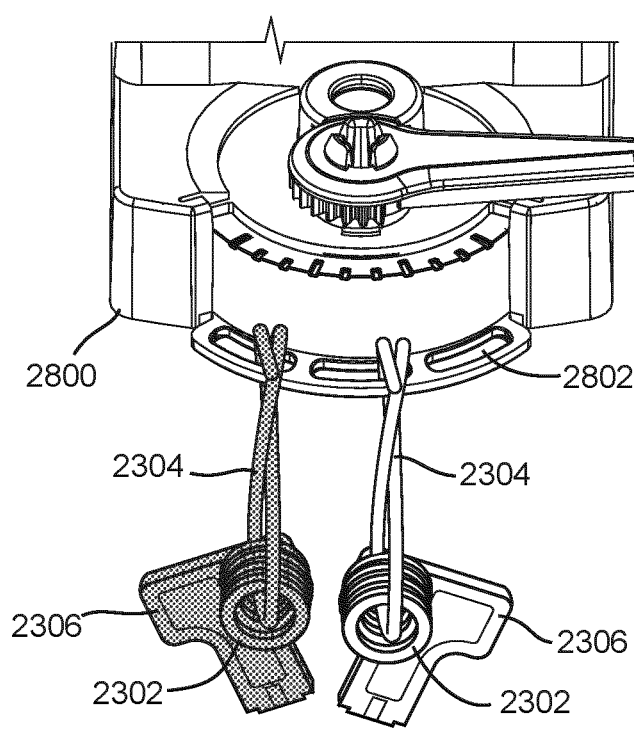
FIG. 30

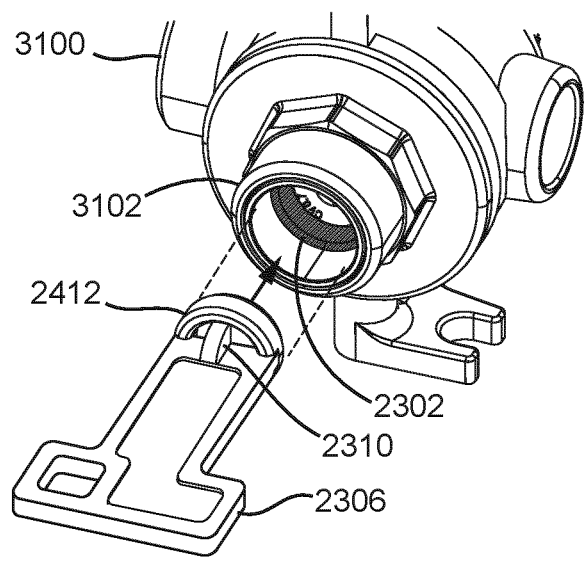
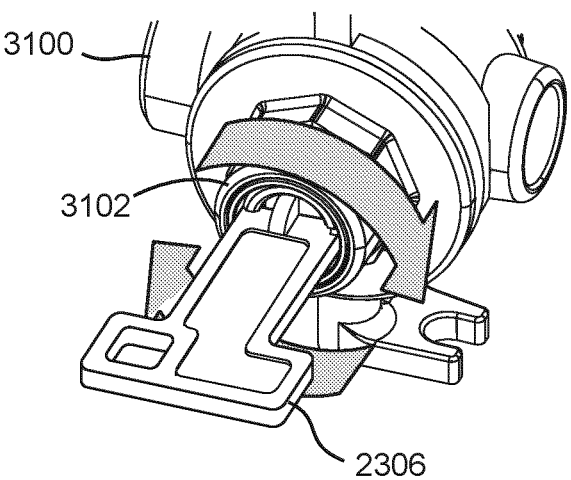
FIG. 31  FIG. 32
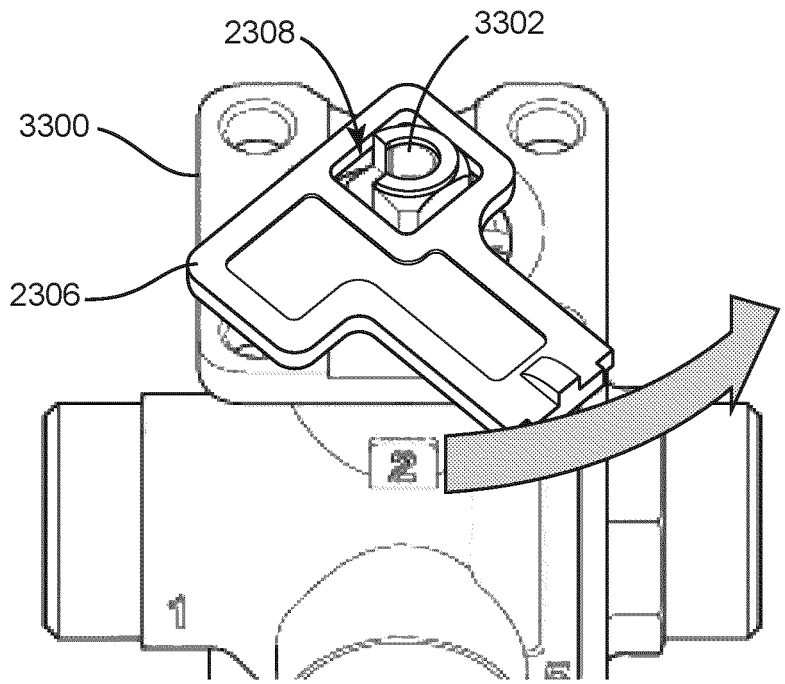
FIG. 33

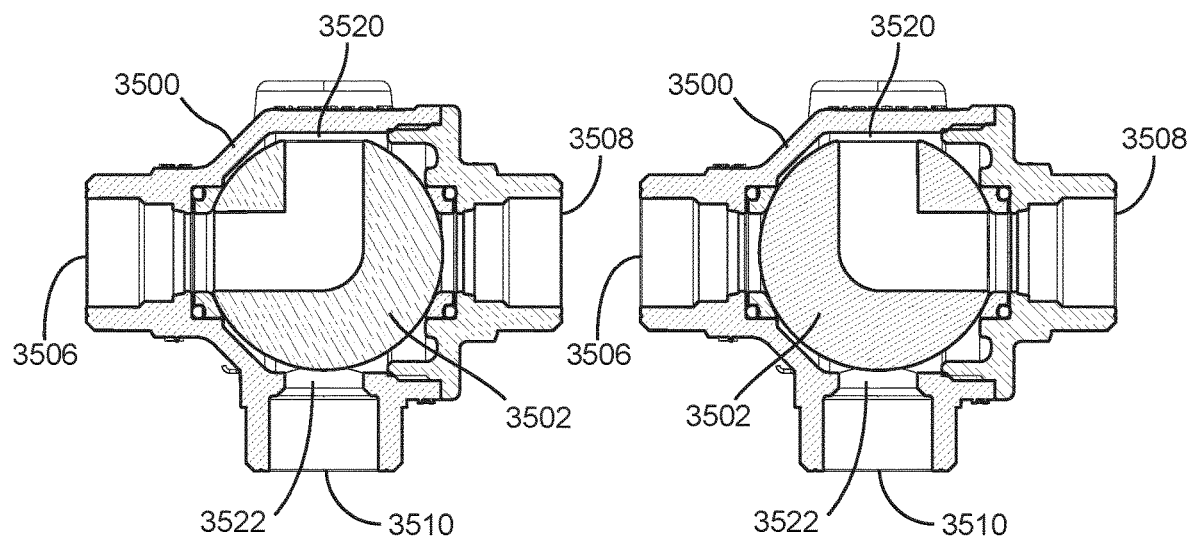
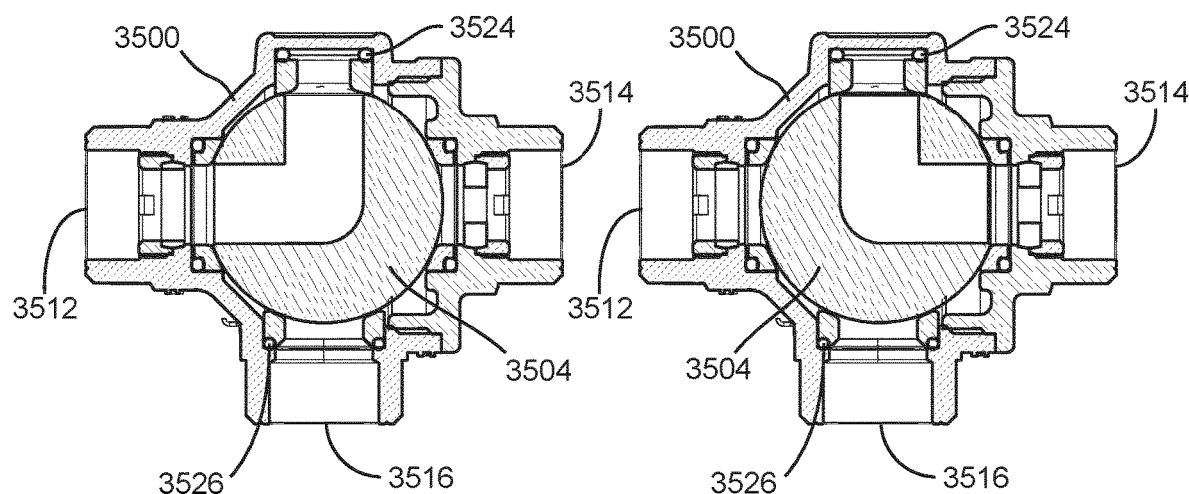
FIG. 35

SECTION A-A

SECTION B-B

SECTION A-A

SECTION B-B

VALVE ASSEMBLY WITH EQUAL PERCENTAGE FLOW CONTROL

CROSS-REFERENCE TO RELATED PATENT APPLICATIONS

This application claims the benefit of and the priority to U.S. Provisional Patent Application No. 62/404,636 filed Oct. 5, 2016, and U.S. Provisional Patent Application No. 62/508,086 filed May 18, 2017. The entire disclosure of each of these patent applications is incorporated by reference herein.

BACKGROUND

Valves regulate, direct, and/or control the flow of a fluid (e.g., gases, liquids, fluidized solids, slurries, etc.) by opening, closing, or partially obstructing various passageways. Valves are often categorized based on the mechanism used to control fluid flow (e.g., ball valves, butterfly valves, choke valves, piston valves, plug valves, poppet valves, etc.).

Ball valves are a type of valve that typically include a spherical disc or valve member carried within a valve body. The spherical valve member includes a passage that can be selectively aligned with ports in the valve body by rotating the valve member relative to the valve body. When the passage aligns with one port and any number of the remaining ports, the valve is said to be in the open position. When the passage is out of alignment with the ports, the valve is said to be in the closed position.

SUMMARY

One implementation of the present disclosure is a valve assembly. The valve assembly includes a valve body having a valve chamber and a plurality of ports into the valve chamber. The plurality of ports include a first port, a second port, and a third port. The first port and the second port are aligned with a common axis and located on opposite sides of the valve chamber. The valve assembly further includes a valve member located within the valve chamber. The valve member includes a rotatable ball with a fluid passage that extends through the ball. The fluid passage includes an opening at an end of the ball. The fluid passage is substantially oval-shaped when viewed at the opening in a direction parallel to the fluid passage. The valve assembly further includes a valve stem that is coupled to a valve member and has a first end that extends from the valve body.

In some embodiments, the fluid passage extending through the valve member is L-shaped. In some embodiments, the L-shaped fluid passage is the only fluid passage through the valve member.

In some embodiments, the valve member is substantially hollow, and the fluid passage further comprises a second opening, the first opening and the second opening disposed approximately 90 degrees apart.

In some embodiments, the rotatable ball further comprises at least one substantially flattened portion located proximate to the valve stem.

In some embodiments, the cross sectional area of the fluid passage is at least as large as the smallest cross sectional area of the plurality of ports.

In some embodiments, the valve member is controllably rotatable to modulate fluid flow between the first port and the third port while maintaining the second port completely closed. In some embodiments, the valve member is controllably rotatable to modulate fluid flow between the second port and the third port while maintaining the first port completely closed.

In some embodiments, the valve body receives a first fluid supply at the first port and a second fluid supply at the second port. Rotating the valve member regulates a flow rate of the first fluid supply to the third port and regulates a flow rate of the second fluid supply to the third port without mixing the first fluid supply and the second fluid supply.

In some embodiments, the valve member rotates between a first end position, in which the first port is fluidly connected with the third port and the second port is closed, and a second end position, in which the second port is fluidly connected with the third port and the first port is closed.

In some embodiments, the third port is aligned with a second axis substantially perpendicular to the common axis. In some embodiments, the valve member rotates about an axis of rotation substantially perpendicular to both the common axis and the second axis. In some embodiments, the valve member directs fluid flow through the valve chamber only in one or more directions substantially perpendicular to an axis of rotation of the valve member.

In some embodiments, the valve body includes a mounting flange. In some embodiments, the mounting flange has at least one slotted opening.

Another implementation of the present disclosure is a system for controlling fluid flow. The system includes a valve assembly having a valve body and a valve member. The valve member is a rotatable ball that includes a fluid passage with an opening at an end of the passage. The fluid passage is substantially oval-shaped when viewed at the opening in a direction parallel to that of the fluid passage. The system further includes an actuator that controllably rotates the valve member relative to the valve body between a first end position and a second end position. The system further includes a controller that operates the actuator to switch between multiple fluid supplies and multiple fluid returns.

In some embodiments, the valve body includes a valve chamber and multiple ports into the valve chamber. The ports includes a first port, a second port, and a third port. The first port and the second port are aligned with a common axis and located on opposite sides of the valve chamber. The valve member is located within the valve chamber and is controllably rotatable within the valve chamber.

In some embodiments, the first end position is approximately 270 degrees from the second end position.

In some embodiments, the valve body includes a mounting flange. In some embodiments, the mounting flange has at least one slotted opening.

Yet another implementation of the present disclosure is a valve assembly. The valve assembly includes a valve body. The valve body includes an upper valve chamber with a first upper port, a second upper port, and a third upper port. The first upper port and the second upper port are aligned with a first common axis and located on opposite sides of the upper valve chamber. The valve body further includes a lower valve chamber with a first lower port, a second lower port, and a third lower port. The first lower port and the second lower port are aligned with a second common axis and located on opposite sides of the lower valve chamber. The valve assembly further includes a valve member located within the upper valve chamber and the lower valve chamber. The valve member includes a first rotatable ball having a first fluid passage with a first opening and a second rotatable ball having a second fluid passage with a second opening. The first fluid passage and the second fluid passage are substantially oval-shaped when viewed at the first opening and the second opening in a direction parallel to that of the first fluid passage. The valve assembly further includes a valve stem coupled to the first rotatable ball and the second rotatable ball with a first end that extends from the valve body.

In some embodiments, the valve assembly further includes a first gasket and a second gasket located within the lower valve chamber.

In some embodiments, the valve body includes a mounting flange. In some embodiments, the mounting flange has at least one slotted opening.

In some embodiments, each of the first rotatable ball and the second rotatable ball further includes at least one substantially flattened portion located proximate to the valve stem.

In some embodiments, the first fluid passage extending through the first rotatable ball is L-shaped. In some embodiments, the L-shaped fluid passage is the only fluid passage through the first rotatable ball.

In some embodiments, each of the first rotatable ball and the second rotatable ball is substantially hollow.

Another implementation of the present disclosure is a valve assembly. The valve assembly includes a valve body having a valve chamber and multiple ports into the valve chamber, including a first port, a second port, and a third port. The first port and the second port are aligned with a common axis and located on opposite sides of the valve chamber. The valve assembly further includes a valve member controllably movable relative to the valve body and configured to modulate fluid flow through the valve assembly and a valve stem coupled to the valve member and extending from the valve body. The valve stem includes a keying feature that ensures correct orientation of the valve member relative to an actuator. The actuator is configured to controllably move the valve member.

In some embodiments, the keying feature includes a notch configured to align with a protrusion located on a drive output of the actuator. In other embodiments, the valve stem is configured to attain a fully engaged position when the valve stem is correctly aligned relative to the actuator and prevented from attaining the fully engaged position by the protrusion on the drive output of the actuator when the valve stem is not properly aligned relative to the actuator.

In some embodiments, the valve body further includes a mounting flange having a cutout region configured to align with a tab located on a mounting flange of the actuator.

In some embodiments, the valve member is configured to rotate between a first end position and a second end position. In the first end position, the first port is fluidly connected with the third port and the second port is closed, and in the second end position, the second port is fluidly connected with the third port and the first port is closed.

Yet another implementation of the present disclosure is a system for controlling fluid flow. The system includes a valve assembly having a valve body with a valve chamber and multiple ports into the valve chamber, a valve member controllably movable relative to the valve body and configured to modulate fluid flow through the valve assembly, and a valve stem coupled to the valve member. The valve stem includes a first keying feature. The system further includes an actuator with a second keying feature and a controller. The first keying feature and the second keying feature are configured to align the valve assembly relative to the actuator. The actuator is configured to controllably rotate the valve member relative to the valve body, while the controller is configured to operate the actuator to switch between multiple fluid supplies or multiple fluid returns.

In some embodiments, the first keying feature includes a notch and the second keying feature includes a protrusion. The protrusion is configured to fit within the notch when the valve stem is correctly oriented relative to the actuator.

In some embodiments, the system further includes a third keying feature and a fourth keying feature. The third keying feature includes a cutout region located on a mounting flange of the valve body, and the fourth keying feature includes a tab located on a mounting flange of the actuator.

In some embodiments, the fourth keying feature further includes an undercut configured to aid in removal of the tab from the mounting flange of the actuator.

In some embodiments, the mounting flange of the valve body further includes multiple holes configured to receive multiple posts located on the mounting flange of the actuator.

In some embodiments, the system further includes indicator labels applied to the actuator and configured to indicate a location of at least one fluid supply. In other embodiments, the indicator labels include a red label positioned to indicate a location of a hot fluid supply and a blue label positioned to indicate a location of a cold fluid supply.

Another implementation of the present disclosure is a system for controlling fluid flow. The system includes a valve assembly having a valve body with a valve chamber and multiple ports including a first port, a second port, and a third port. The first port and the second port are aligned with a common axis and located on opposite sides of the valve chamber. The valve body is configured to receive a first fluid supply at the first port and a second fluid supply at the second. The system further includes a valve member controllably movable relative to the valve body and configured to modulate fluid flow through the valve assembly, an actuator configured to controllably rotate the valve member relative to the valve body, and a pointer arm coupled to the actuator via a gear mechanism and configured to indicate an orientation of the valve member.

In some embodiments, the pointer arm and the valve member rotate about a common axis of rotation and are rotationally coupled such that the pointer arm and the valve member rotate in opposite rotational directions.

In some embodiments, rotation of the pointer arm is configured to cause a corresponding rotation of the valve member. In other embodiments, an approximately 180 degree rotation of the pointer arm causes an approximately 270 degree rotation of the valve member.

In some embodiments, the valve member is configured to rotate between a first end position and a second end position. In the first end position, the first port is fluidly connected with the third port and the second port is closed, and in the second end position, the second port is fluidly connected with the third port and the first port is closed.

In some embodiments, the gear mechanism has a gear ratio of 2:3, such that rotation of the pointer arm by 2 degrees causes a corresponding rotation of the valve member by 3 degrees.

In some embodiments, the system further includes indicator labels applied to the actuator and configured to indicate a location of at least one fluid supply. In other embodiments, the indicator labels include a red label positioned to indicate a location of a hot fluid supply and a blue label positioned to indicate a location of a cold fluid supply.

Yet another implementation of the present disclosure is a multipurpose valve tool. The tool includes multiple flow control discs configured to be installed within a valve body of a valve assembly to modulate a flow of fluid through at least one outlet port of the valve body, a retention ring configured to retain the flow control discs on a component of the valve assembly when the flow control discs are not installed within the valve body, and a valve key having a first end configured to engage an installation feature in a retention fastener for one of the flow control discs. The flow control discs, the retention ring, and the valve key are detachably coupled to each other.

In some embodiments, the tool is formed via an injection molding process.

In some embodiments, the component of the valve assembly is the valve body or an actuator.

In some embodiments, the valve key further includes a second end having a cutout region. The cutout region is configured to couple to a valve stem of the valve assembly in order to rotate a valve member of the valve assembly.

In some embodiments, the installation feature is a recess on a face of the retention fastener.

In some embodiments, each flow control disc has a unique central bore diameter. In other embodiments, each flow control disc has an identical outer diameter.

In some embodiments, the retention fastener has a threaded outer diameter portion. The threaded outer diameter portion configured to be threadably coupled to an outlet port of the valve body.

In some embodiments, each of the flow control discs has a flow coefficient indicator feature identifying a flow rate that can be achieved when the flow control disc is installed in the outlet port of the valve body. In other embodiments, the flow coefficient indicator feature includes text expressing the flow coefficient of the flow control disc in at least one of metric units Kv or imperial units Cv.

In some embodiments, the retention ring is substantially U-shaped and terminates at a first curved end and a second curved end. The first curved end and the second curved end are configured to be intertwined.

In some embodiments, the first end of the valve key is substantially cross-shaped.

Another implementation of the present disclosure is a multipurpose valve tool. The valve tool includes multiple flow control discs configured to be installed within a valve body of a valve assembly and to modulate a flow of fluid through at least one outlet port of the valve body and a retention ring. The retention ring includes a substantially U-shaped portion terminating at a first curved end and a second curved end. The first curved end and the second curved end are configured to be intertwined to retain the flow control discs on a component of the valve assembly when the flow control discs are not installed within the valve body. The valve tool further includes a valve key having a cutout region configured to couple to a valve stem of the valve assembly in order to rotate a valve member of the valve assembly. The flow control discs, the retention ring, and the valve key are formed as an integrated part and detachably coupled to each other.

In some embodiments, the integrated part is fabricated from a blue plastic injection molded material or a red plastic injection molded material.

In some embodiments, each of the flow control discs has a flow coefficient indicator feature identifying a flow rate that can be achieved when the flow control disc is installed in the outlet port of the valve body.

Another implementation of the present disclosure is a system for controlling fluid flow. The system includes a valve assembly including a valve body having a valve chamber and multiple ports into the valve chamber, a valve member controllably movable relative to the valve body and configured to modulate fluid flow through the valve assembly, and a valve stem coupled to the valve member and extending from the valve body. The system further includes an actuator with a motor and a drive device. The drive device is driven by the motor and coupled to the valve stem for driving the valve member between multiple positions. The system further includes multiple flow control discs configured to be installed within the valve body to modulate a flow of fluid through at least one outlet port of the valve body. Each flow control disc includes a central bore having a unique diameter. The system additionally includes a retention ring configured to be inserted through the central bore of each of the flow control discs to retain the flow control discs.

In some embodiments, the retention ring is further configured to retain a valve key. The valve key includes a cutout region configured to couple to the valve stem in order to rotate the valve member.

In some embodiments, the valve key is further configured to terminate in a substantially cross-shaped end opposite the cutout region. The substantially cross-shaped end is configured to engage an installation feature on a retention fastener for one of the flow control discs.

In some embodiments, the retention ring is substantially U-shaped and terminates at a first curved end and a second curved end. The first curved end and the second curved end are configured to be intertwined.

In some embodiments, the retention ring is further configured to be inserted through an aperture in at least one of the valve body or the actuator.

Still another implementation of the present disclosure is a system for controlling fluid flow. The system includes a valve assembly. The valve assembly includes a valve body and a valve member. The valve body includes a valve chamber and multiple ports into the valve chamber, including a first port, a second port, and a third port. The first port and the second port are aligned with a common axis and located on opposite sides of the valve chamber. The valve member is located within the valve chamber and includes a ball having a fluid passage. The valve member is configured to rotate approximately 270 degrees between a first end position in which the first port is fluidly connected with the third port and the second port is closed, and a second end position in which the second port is fluidly connected with the third port and the first port is closed. The system further includes an electronically-controllable actuator including a motor and a drive device. The drive device is driven by the motor and is coupled to the valve assembly for driving the valve member between the first end position and the second end position. The system additionally includes an electronic actuator controller. The electronic actuator controller includes a communications interface configured to receive a linear control mode signal and to transmit an equal percentage mode signal and a processing circuit coupled to the motor and the communications interface. The processing circuit is configured to determine the equal percentage mode signal using an equal percentage flow algorithm. The equal percentage flow algorithm includes an equation used to convert the linear control mode signal to the equal percentage mode signal. The linear control mode signal is configured to operate the motor to drive the drive device to a first actuator position setpoint, and the equal percentage mode signal is configured to operate the motor to drive the drive device to a second actuator position setpoint such that a flow rate through the valve assembly is proportional to the linear control mode signal.

In some embodiments, the system further includes a supervisory controller configured to transmit the linear control mode signal to the communications interface of the electronic actuator controller.

In some embodiments, an equation used to convert the linear control mode signal to the equal percentage mode signal is nonlinear.

In some embodiments, the processing circuit is further configured to retrieve an equation used to convert the linear control mode signal to the equal percentage mode signal from a lookup table.

In some embodiments, an equation used to convert the linear control mode signal to the equal percentage mode signal is based on a dual in-line package (DIP) switch setting on the electronically-controllable actuator.

In some embodiments, an equation used to convert the linear control mode signal to the equal percentage mode signal is based on a geometric characteristic of the valve assembly. In other embodiments, the geometric characteristic is a dimension of the fluid passage extending through the valve member.

In some embodiments, the electronically-controllable actuator is at least one of a direct acting actuator or a reverse acting actuator.

In some embodiments, the linear control mode signal ranges from 0 to 10 VDC. In other embodiments, the equal percentage mode signal ranges from 0 to 10 VDC.

Another implementation of the present disclosure is a method for operating a valve assembly performed by an electronic actuator controller. The method includes receiving a linear control mode signal for an electronically-controllable actuator at a communications interface. The linear control mode signal is configured to operate the electronically-controllable actuator to a first actuator position setpoint. The method also includes a processing circuit applying an equal percentage flow algorithm to the linear control mode signal. The equal percentage flow algorithm includes at least one equation used to convert the linear control mode signal to an equal percentage mode signal. The method further includes the communications interface transmitting the equal percentage mode signal to the electronically-controllable actuator. The equal percentage mode signal is configured to operate the electronically-controllable actuator to a second actuator position setpoint such that a flow rate through the valve assembly is proportional to the linear control mode signal.

In some embodiments, an equation used to convert the linear control mode signal to the equal percentage mode signal is nonlinear.

In some embodiments, the method further includes the processing circuit retrieving an equation used to convert the linear control mode signal to the equal percentage mode signal from a lookup table.

In some embodiments, an equation used to convert the linear control mode signal to the equal percentage mode signal is based on a dual in-line package (DIP) switch setting on the electronically-controllable actuator.

In some embodiments, an equation used to convert the linear control mode signal to the equal percentage mode signal on a geometric characteristic of the valve assembly.

In some embodiments, the linear control mode signal ranges from 0 to 10 VDC. In other embodiments, the equal percentage mode signal ranges from 0 to 10 VDC.

Still another implementation of the present disclosure is system for controlling fluid flow. The system includes a valve assembly. The valve assembly includes a valve body having a valve chamber and multiple ports into the valve chamber, and a valve member located within the valve chamber and comprising a ball having a fluid passage. The system further includes an electronically-controllable actuator for rotating the valve member between the first end position and the second end position. The first end position is approximately 270 degrees from the second end position. Finally, the system includes an electronic actuator controller. The electronic actuator controller includes a communications interface configured to receive a linear control mode signal and to transmit an equal percentage mode signal and a processing circuit coupled to the electronically-controllable actuator and the communications interface. The processing circuit is configured to determine the equal percentage mode signal using an equal percentage flow algorithm. The equal percentage flow algorithm includes at least one equation used to convert the linear control mode signal to the equal percentage mode signal and is configured to operate the electronically-controllable actuator to an actuator position setpoint such that a flow rate through the valve assembly is proportional to the linear control mode signal.

In some embodiments, an equation used to convert the linear control mode signal to the equal percentage mode signal is based on a geometric characteristic of the valve assembly.

In some embodiments, an equation used to convert the linear control mode signal to the equal percentage mode signal is nonlinear.

BRIEF DESCRIPTION OF THE DRAWINGS

FIG. 7 is a perspective view drawing of a slotted mounting bracket for the valve of FIG. 1, according to some embodiments.

FIG. 8 is a perspective view drawing of the installation of a valve and actuator assembly, according to some embodiments.

FIG. 20 is a perspective view of the position of the manual override handle when the valve of FIG. 1 is in a cold water flow orientation, according to some embodiments.

FIG. 21 is perspective view of the position of the manual override handle when the valve of FIG. 1 is in a no water flow orientation, according to some embodiments.

FIG. 22 is another perspective view of the position of the manual override handle when the valve of FIG. 1 is in a hot water flow orientation, according to some embodiments.

FIG. 23 is a front elevation view drawing of a multipurpose valve tool, according to some embodiments.

FIG. 24 is a sectional view drawing of flow limiting discs installed within the valve of FIG. 1, according to some embodiments.

FIG. 28 is a side elevation view drawing of a retention ring, flow limiting discs, and a valve key coupled to an actuator, according to some embodiments.

FIG. 29 is another side elevation view drawing of a retention ring, flow limiting discs, and a valve key coupled to an actuator, according to some embodiments.

FIG. 30 is a perspective view drawing of retention rings, flow limiting discs, and valve keys coupled to an actuator, according to some embodiments.

FIG. 31 is a perspective view drawing of a valve key utilized to install a flow limiting disc in the valve of FIG. 1, according to some embodiments.

FIG. 32 is another perspective view drawing of a valve key utilized to install a flow limiting disc in the valve of FIG. 1, according to some embodiments.

FIG. 33 is a perspective view drawing of a valve key utilized to manually actuate the valve member of the valve of FIG. 1, according to some embodiments.

FIG. 35 are top sectional view drawings of the upper and lower chambers of the valve of FIG. 1, according to some embodiments.

DETAILED DESCRIPTION

Valve Assembly Overview

Referring generally to the FIGURES, systems for controlling fluid flow, including a valve with an elongated flow passage are shown, according to various exemplary embodiments. The systems described herein may be used to regulate fluid flow from multiple fluid supplies and/or to multiple fluid returns. In some embodiments, the valve is a three-way valve having a valve body and a valve member. In other embodiments, the valve is a six-way valve having a valve body and a valve member. The valve body may include a valve chamber and a plurality of ports in fluid communication with the valve chamber (e.g., a first port, a second port, a third port, etc.). The valve member may have an L-shaped passage extending therethrough. The valve may be controlled (e.g., by an actuator and/or a controller) to rotate the valve member within the valve chamber.

Ball valves can be classified based on the number of connections formed by the valve (e.g., two-way valves, three-way valves, etc.), the shape of the passage through the spherical valve member (e.g., L-shaped, T-shaped, X-shaped, etc.), and the size of the passage through the valve member (e.g., full bore, reduced bore, etc.). Three-way ball valves are often used to switch between two separate fluid supplies and/or returns. Six-way ball valves, which combine two three-way valve bodies in a stacked orientation, may be used to switch between both two fluid supplies and two fluid returns. The six-way valve body may use two separate valve members (e.g., for independently switching fluid supplies and fluid returns) or a shared valve member (e.g. for switching fluid supplies and fluid returns in unison).

Conventional three-way valves and six-way valves often contain flow passages through the valve member that may be characterized as full-bore or reduced-bore. Full-bore passages have a cross-sectional area at least the size of the ports into the valve chamber, whereas reduced-bore passages are smaller than the size of the ports into the valve chamber. Full-bore passages provide many advantages, such as lower friction losses and a lower pressure drop across the valve. However, the geometry of a full-bore passage may necessitate a larger valve member, which may be undesirable in space-limited applications. Advantageously, the systems of the present disclosure use a valve that includes an elongated flow passage that increases the size of the flow passage without requiring a corresponding increase in the size of the valve member.

Figure 1:
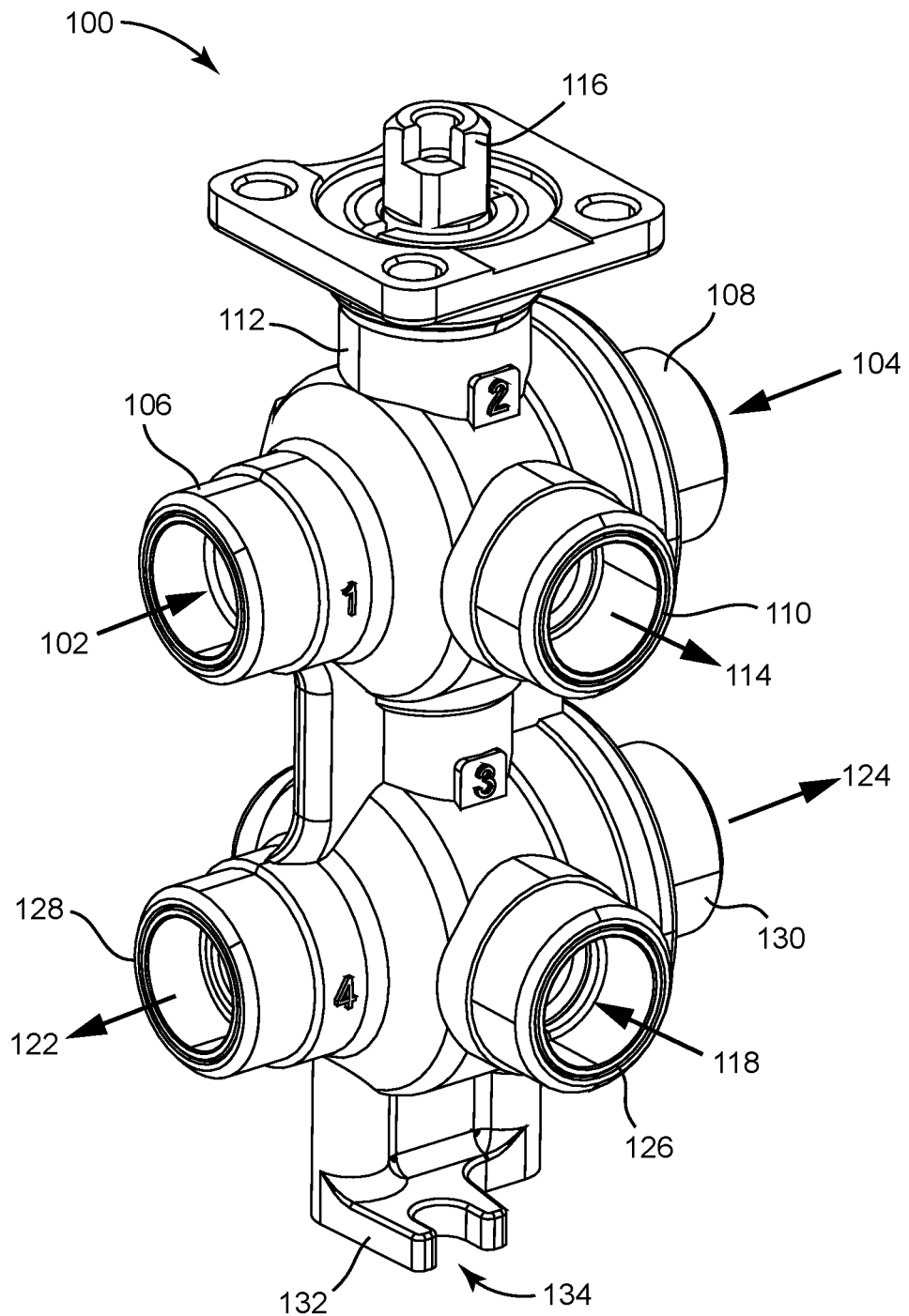
FIG. 1 is a perspective view drawing of a six-way valve configured to simultaneously switch between two fluid supplies and two fluid returns by rotating a single valve member, according to some embodiments.

Referring now to FIG. 1, a six-way valve assembly 100 is shown according to an exemplary embodiment. Six-way valve assembly 100 is shown to include a six-way valve body 112 and a valve member 116. Six-way valve body 112 may combine two three-way valve bodies in a stacked orientation. In the stacked orientation, a single valve member 116 can be used to control fluid flow through both of the three-way valve bodies. Advantageously, six-way valve assembly 100 may be controlled by a single actuator acting upon valve member 116.

Six-way valve assembly 100 may be used to switch between two fluid supplies and two fluid returns. For example, six-way valve assembly 100 may be configured to receive first fluid supply 102 at first supply port 106 and to receive second fluid supply 104 at second supply port 108. As shown, first port 106 and second port 108 may be inline ports (e.g., aligned with a common axis) and may be located on opposites sides of the valve chamber. Valve member 116 may be rotated to selectively control fluid flow from either first supply port 106 or second supply port 108 to outlet port 110 (e.g., without mixing).

Outlet port 110 may be a transverse port (e.g., not inline with ports 106 and 108). As shown, outlet port 110 is substantially perpendicular to ports 106 and 108 and in the same plane as ports 106 and 108. In other embodiments, outlet port 110 may be oriented at a variety of different angles relative to ports 106 and 108 and may not be in the same plane as ports 106 and 108. Outlet port 110 may connect to a fan coil unit (e.g., via a coil supply line). The fluid from outlet port 110 may pass through a fan coil unit and return to valve assembly 100 at return port 126. Valve member 116 may be rotated to selectively divert fluid from return port 126 to either first return port 128 or second return port 130. Return ports 128 and 130 may be fluidly connected to returns 122 and 124, respectively.

In various embodiments, the plurality of ports 106-130 may include any number of ports (e.g., two ports, three ports, four ports, six ports, twenty ports, etc.). Ports 106-130 may be configured to connect to pipes, tubes, or other fluid control components. Ports 106-130 may be configured to connect with fluid pipelines using threadings, compression fittings, glue, cement, flanges, welding, or other fasteners.

Valve body 112 may be made from any of a variety of materials including, for example, metals (e.g., cast iron, brass, bronze, steel, stainless steel, aluminum, etc.), plastics (e.g., PVC, PP, HDPE, etc.), glass-reinforced polymers (e.g., fiberglass), ceramics, or any combination thereof. The material or materials used to form valve body 112 may be based on the application for which valve body 112 is intended. For example, corrosion-resistant materials may be used for implementations in which valve body 112 is used with corrosive fluids (e.g., salt water, acidic fluids, etc.).

Still referring to FIG. 1, valve assembly 100 is shown to include valve member 116. Valve member 116 may include one or more ball members and a valve stem. The ball members may be substantially spherical. As used herein, "substantially spherical" may refer to a ball member with a spherical outer profile except for the inclusion of flattened surfaces near the locations where the ball members are coupled to the valve stem. These flattened surfaces may permit a reduction in the overall height of the valve assembly 100. Further details regarding the geometry of the ball members is included below with reference to FIGS. 36-43. The substantially spherical ball member or members may result in valve assembly 100 being characterized as a ball valve. In various embodiments, the ball member may be fixedly attached to the valve stem or combined with the valve stem into a single component. The valve stem may extend through valve body 112 and connect to a handle or actuator for controlling the rotation of the valve member 116.

In operation, valve member 116 may be located at least partially within the internal valve chamber. Valve member 116 may be controllably movable (e.g., in rotation, in linear movement, etc.) relative to valve body 112 to modulate fluid flow through valve 100. By rotating valve member 116 relative to valve body 112, fluid flow can be selectively controlled (e.g., diverted, adjusted, increased, decreased, etc.) between the plurality of ports 106-130.

Each ball member may include a passage that permits fluid to flow through the ball member. In some embodiments, the passage is L-shaped (e.g., having two openings and a single ninety degree bend). The passage may be formed by drilling two bores into the ball member at approximately 90 degrees relative to each other. The bores may connect to form the passage through the ball member. Conventional ball valves may have bores with a substantially circular-shaped shaped cross section. In other embodiments, the passage may be T-shaped (e.g., having a main bore straight through the ball member and a second bore extending perpendicularly from one side of the main bore), X-shaped (e.g., having two bores extending through the ball member and intersecting as a ninety degree angle) or having any other shape.

The passage through the ball member may be controllably aligned (e.g., partially aligned, fully aligned, etc.) with ports 106-130 to form a fluid connection between pairs of ports. For example, the passage may be rotated into alignment with either first port 106 and third port 110, or second port 108 and third port 110. Under the six-way valve configuration of valve 100, the passage may additionally be rotated into alignment with either return port 126 and first return port 128, or return port 126 and second return port 130.

Figure 2:
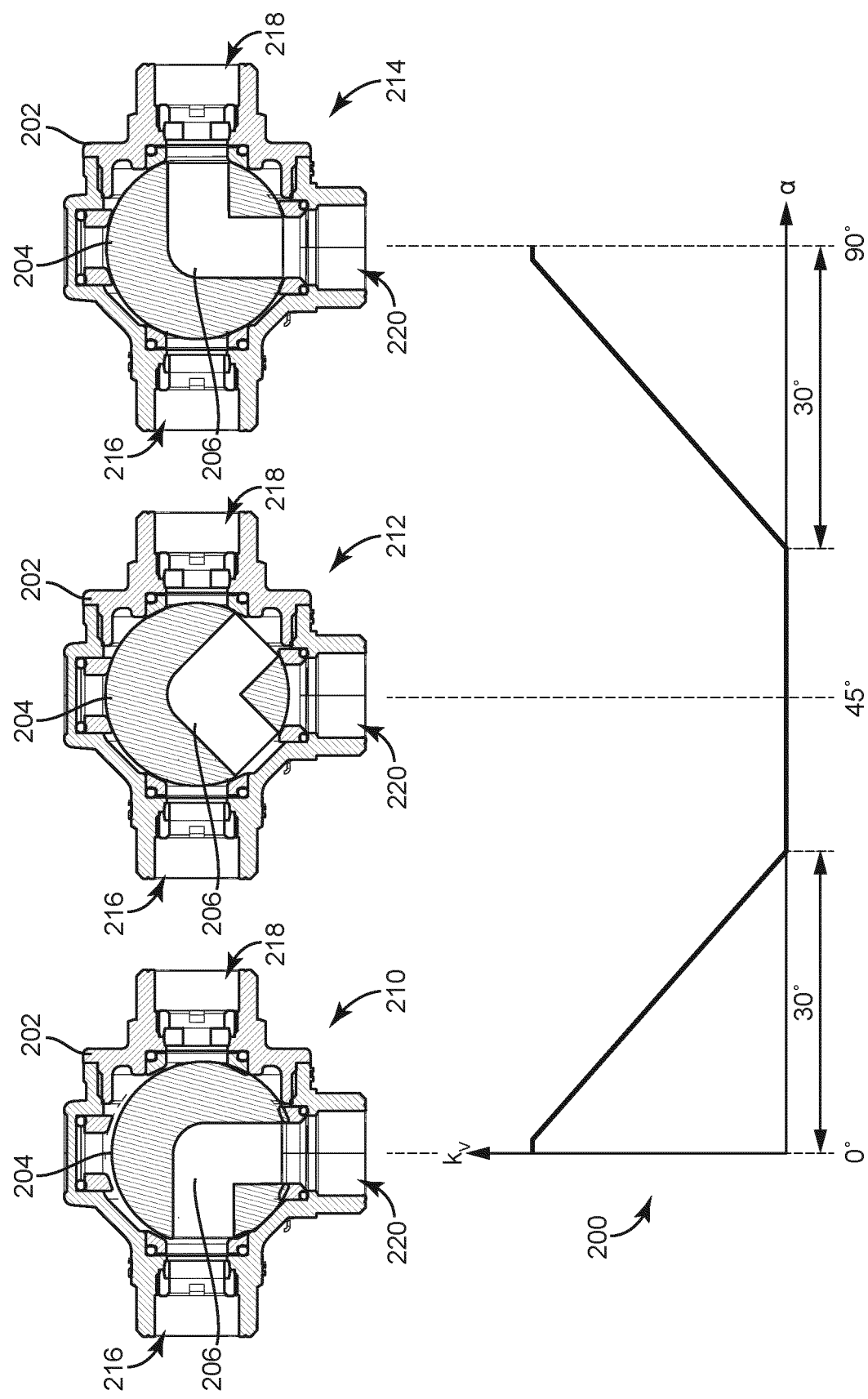
FIG. 2 is a flow diagram illustrating the flow control capability of a valve assembly in which the valve member is rotated by 90 degrees, according to some embodiments.

Referring now to FIG. 2 a flow diagram 200 is shown, according to an exemplary embodiment. Flow diagram 200 illustrates the flow control ability of a conventional fluid control valve 202. Valve 202 is operated by rotating valve member 204 by 90° between a first end position 210 and a second end position 214.

Fluid flow through valve 202 can be controlled by rotating valve member 204 by a total of 90 degrees. Fluid flow between ports 216 and 220 is controlled by rotating valve member 204 approximately 30° from first end position 210 toward intermediate position 212. Fluid flow between ports 218 and 220 is controlled by rotating valve member 204 by approximately 30° from second end position 214. With valve 202, fluid flow can be adjusted between a maximum flow rate (i.e., at end positions 210 and 214) and a zero flow rate, by rotating valve member 204 by 30°. The 30° separation between maximum and minimum flow causes a relatively small rotation of valve member 204 to result in a relatively large change in flow rate.

In other embodiments, the valve assembly is operated by rotating a valve member 270° between a first end position and a second end position. Rotating the valve member by approximately 270° may regulate a flow rate of the first fluid supply (e.g., received via port 216) to the third port (e.g., port 220) and a flow rate of the second fluid supply (e.g., received via port 218) to the third port (e.g., port 220) without mixing the first fluid supply and the second fluid supply. Further details of a 270° rotation ball valve assembly may be found in U.S. Pat. No. 9,677,717 filed Feb. 11, 2014. The entire disclosure of U.S. Pat. No. 9,677,717 is incorporated by reference herein.

Valve Ball Member Geometry

Figure 5:
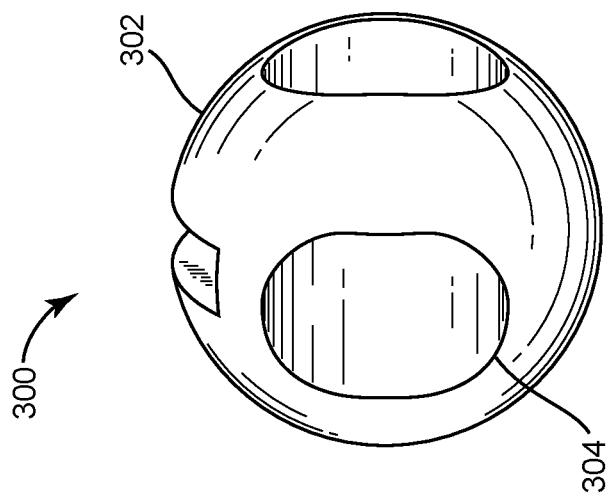
FIG. 5 is another perspective view drawing of the valve member illustrating an elongated flow passage, according to some embodiments.
Figure 4:
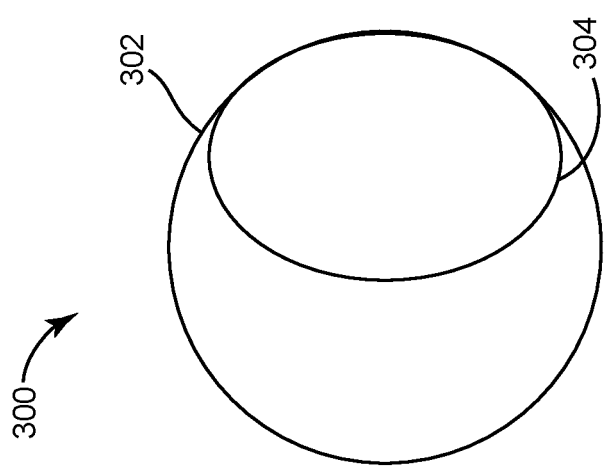
FIG. 4 is another perspective view drawing of the valve member illustrating an elongated flow passage, according to some embodiments.
Figure 3:
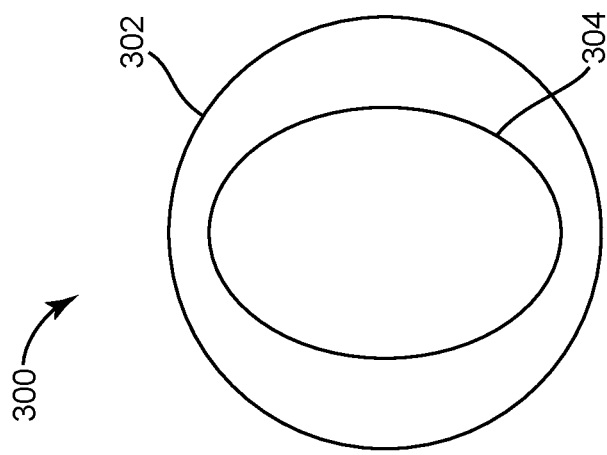
FIG. 3 is a perspective view drawing of the valve member illustrating an elongated flow passage, according to some embodiments.

Referring now to FIGS. 3-5, perspective views of a ball member 300 are shown, according to an exemplary embodiment. Conventional ball members have flow passages which may be categorized as full-bore or reduced-bore. A full-bore passage may be defined as a passage having a size (e.g., diameter, radius, cross-sectional area, etc.) that is at least the same size as the pipeline connection to valve assembly 100. Conversely, a reduced-bore passage may be defined as a passage in which the size of the passage is less than the size of the pipeline connection.

A full-bore passage provides several advantages over a reduced-bore passage. For example, a full-bore passage does not act to restrict incoming flow, thereby resulting in an improved flow rate potential (e.g., a faster maximum flow rate) and lower friction losses relative to a reduced-bore passage. With lower friction losses, the pressure drop across the valve is lower, and a smaller pump is required to maintain the required system fluid pressure. In some embodiments, for example, increasing the size of the flow passage by 10% may reduce the pressure drop across a valve by 18%, whereas increasing the size of the passage by 20% may reduce the pressure drop by 30%.

Although full-bore passages offer substantial advantages over reduced-bore passages, there may be corresponding drawbacks associated with simply increasing the size of the valve member (and the overall size of the valve) in order to accommodate a larger flow passage. For example, a larger valve member requires greater torque to rotate when controlling fluid flow through valve assembly 100. Thus, a larger actuator to rotate the valve member may be required. Larger parts increase material costs, and larger valves may not be practical or even possible to install in applications that are space-limited.

FIGS. 3-5 depict perspective views of a ball member 300 component of a valve member (e.g., valve member 116) with a type of elongated flow passage. For example, FIG. 3 depicts a front elevation view of a ball member 300 with seat geometry 302 and a substantially oval-shaped flow passage 304. FIGS. 4 and 5 depict perspective views of a ball member 300 with respectively, an oversized flow passage 304 and an oval-shaped flow passage 304. In each of the FIGS. 3-5, seat geometry 302 depicts the outer extents of the ball member 300, whereas flow passage 304 depicts the shape of the flow passage bore within the ball member 300. As shown in FIGS. 3 and 5, the flow passage 304 is not circular when viewed parallel to the direction of the bore, but instead is elongated such that the flow passage 304 is substantially oval-shaped when viewed parallel to the direction of the bore (i.e., the height of the passage is greater than the width, as shown in FIG. 3). This geometry permits an increase in the overall cross-sectional area of the flow passage 304, resulting in improved flow rate potential. Likewise, the oversized flow passage 304 depicted in FIG. 4 results in improved flow rate potential. In various embodiments, the cross-section of the flow passage 304 may be other non-circular shapes, including an elongated circle, or an ellipse.

The elongated or oversized cross-sectional area of the flow passage 304 depicted in FIGS. 3-5 provides an additional advantage in that the overall size of the ball member 300 represented by seat geometry 302 may be reduced relative to a ball member with a circular passage with the same cross-sectional area. A reduction in the size of the ball member 300 may result in an overall reduction in the height of the valve assembly. In various embodiments, the seat geometry 302 of the reduced size ball member 300 may not be spherical, but instead may be substantially flattened along planes parallel to the height of the flow passage. (See also FIGS. 36 and 41 for depictions of the flattened shape of the reduced height ball members in exploded views of the valve assembly.) In some embodiments, the flow passage 304 through the ball member 300 may form an L-shape when viewed in cross-section (see also FIG. 35 for cross-sectional views of an L-shaped flow passage). In other embodiments, the flow passage 304 through the ball member 300 may be characterized as substantially straight or T-shaped.

Valve Assembly Control System

Figure 6:
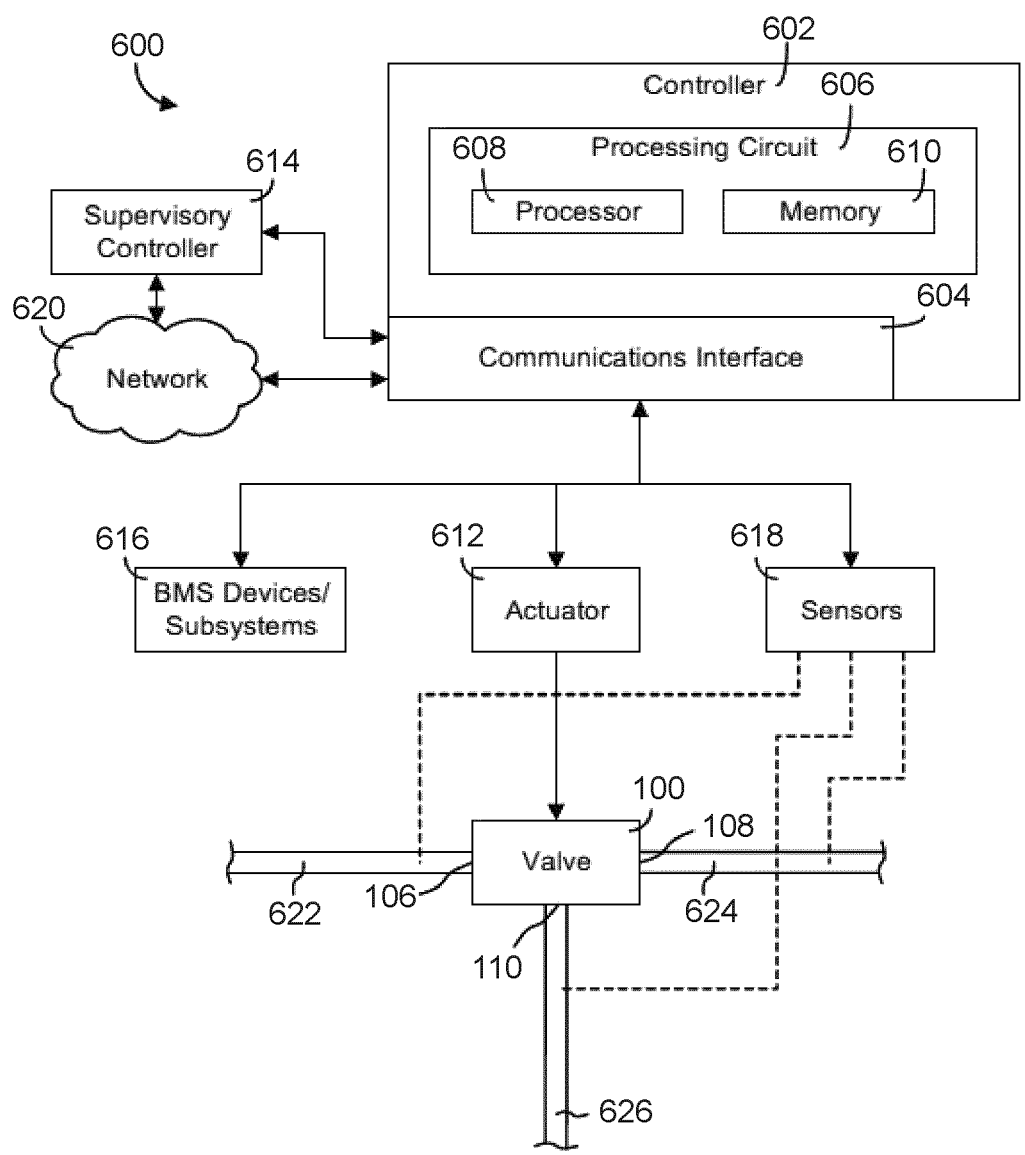
FIG. 6 is a block diagram of a control system configured to operate the valve of FIG. 1, according to some embodiments.

Referring now to FIG. 6, a block diagram of a control system 600 is shown, according to an exemplary embodiment. Control system 600 may be used to monitor and control any number of conditions, states, or variables of a controlled system (e.g., a building system, a plumbing system, an HVAC system, etc.) including, for example, the rotational position of fluid control valve 100.

In some embodiments, control system 600 is a local control system (e.g., local to a building, building zone, building system, etc.). In other embodiments, control system 600 is a distributed or remote control system. Control system 600 may be used to control a single device (e.g., valve 100) or a plurality of devices (e.g., a chiller, boiler, air handling unit, damper, etc.). The plurality of devices may be located within a single building or building system or spread throughout several buildings or discrete building systems. In some embodiments, control system 600 is part of a comprehensive building automation system such as a METASYS® brand building automation system sold by Johnson Controls, Inc. In other embodiments, control system 600 is a local control system for one or more valves and/or other HVAC devices.

Control system 600 is shown to include a controller 602 having a communications interface 604 and a processing circuit 606. Communications interface 604 may include wired or wireless interfaces (e.g., jacks, antennas, transmitters, receivers, transceivers, wire terminals, etc.) for conducting data communications with, for example, actuator 612, supervisory controller 614, BMS devices/subsystems 616, sensors 618, or other external devices or data sources. Data communications may be conducted via a direct connection (e.g., a wired connection, an ad-hoc wireless connection, etc.) or via a communications network 620 (e.g., an Internet connection, a LAN, WAN, or WLAN connection, etc.).

Communications interface 604 may be configured to receive control signals from a supervisory controller 614 (e.g., specific operating instructions, setpoint instructions, etc), measurement signals from sensors 618, and/or other types of electronic data communications from various building management system (BMS) devices or subsystems 616. For example, communications interface 604 may receive measurement signals from sensors 618 indicating a state or condition (e.g., temperature, pressure, flow rate, etc.) of the fluids in pipelines 622-626. As shown in FIG. 6, pipelines 622, 624, and 626 may connect to ports 106, 108, and 110 of valve assembly 100, respectively.

Still referring to FIG. 6, controller 602 is shown to include a processing circuit 606 having a processor 608 and memory 610. Processor 608 can be implemented as a general purpose processor, an application specific integrated circuit (ASIC), one or more field programmable gate arrays (FPGAs), a group of processing components, or other suitable electronic processing components. Memory 610 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 610 may include volatile memory or non-volatile memory. Memory 610 may include database components, object code components, script components, or any other type of information structure for supporting the various activities and information structures described herein.

In some embodiments, controller 602 is a feedback loop controller (e.g., a proportional gain controller, a proportional-integral (PI) controller, a proportional-integral-derivative (PID) controller, and adaptive gain controller, a pattern recognition adaptive controller (PRAC), a model predictive controller, etc.) Controller 602 may be configured to monitor the fluids in pipelines 622-626 (e.g., using measurement signals received from sensors 618). Controller 602 may use the signals from sensors 618 to operate fluid control valve 100 and to achieve a desired setpoint. For example, controller 602 may be configured to operate fluid control valve 100 to achieve a temperature setpoint, a pressure setpoint, a flow rate setpoint, or any other type of setpoint received from supervisory controller 614 or from a user device (e.g., via network 620).

Controller 602 may be configured to automatically operate fluid control valve 100 using an actuator 612. Actuator 612 may be rotatably coupled to a valve stem of fluid control valve 100 and configured to cause valve member 116 to rotate (e.g., by acting upon a valve stem). Actuator 612 may be any type of mechanism capable of acting upon valve 100 to cause a rotation of valve member 116. For example, actuator 612 may include an electric motor and a drive device that are operable in response to a control signal from controller 602 to cause a rotation of valve member 116.

Valve Assembly Mounting

Referring now to FIGS. 7 and 8, views of the mounting features of a valve assembly 700 and a valve and actuator assembly 800 are shown, according to some embodiments. FIG. 7 depicts a valve assembly 700 having return ports 726, 728, and 730. In some embodiments, valve assembly 700 is identical or substantially similar to valve assembly 100, described above with reference to FIG. 1. Valve assembly 700 is further shown to include a mounting flange 732 extending below the return ports 726-730. In various embodiments, the mounting flange 732 includes one or more slotted openings 734. For example, mounting flange 732 may include two slotted openings 734 located approximately 180° apart. Slotted openings 734—as opposed to through holes—may be provided in mounting flange 732 in order to permit fasteners to slide laterally into position for mounting. This is advantageous because the presence of one or more return ports 726-730 may limit the clearance around the mounting flange 732 and the ability of fasteners to be positioned for mounting vertically, as would be required if through holes were provided instead of slotted openings.

FIG. 8 depicts the installation of a valve and actuator assembly 800 via a mounting bracket, according to some embodiments. As shown, valve and actuator assembly 800 includes an actuator assembly 802 and a valve assembly 804. The valve assembly 804 is secured to a mounting bracket 806 via fasteners 808 and 810. As shown, the fasteners include bolts 808 and nuts 810, although any suitable fasteners may be utilized to secure the valve and actuator assembly 800 to mounting bracket 806. In various embodiments, the mounting bracket 806 may be secured to any suitable structure within a building or an HVAC system to ensure that the actuator assembly 802 and the valve assembly 804 are positioned to be successfully connected to all required electrical and fluid connections.

Valve Assembly Check Valves

Figure 9:
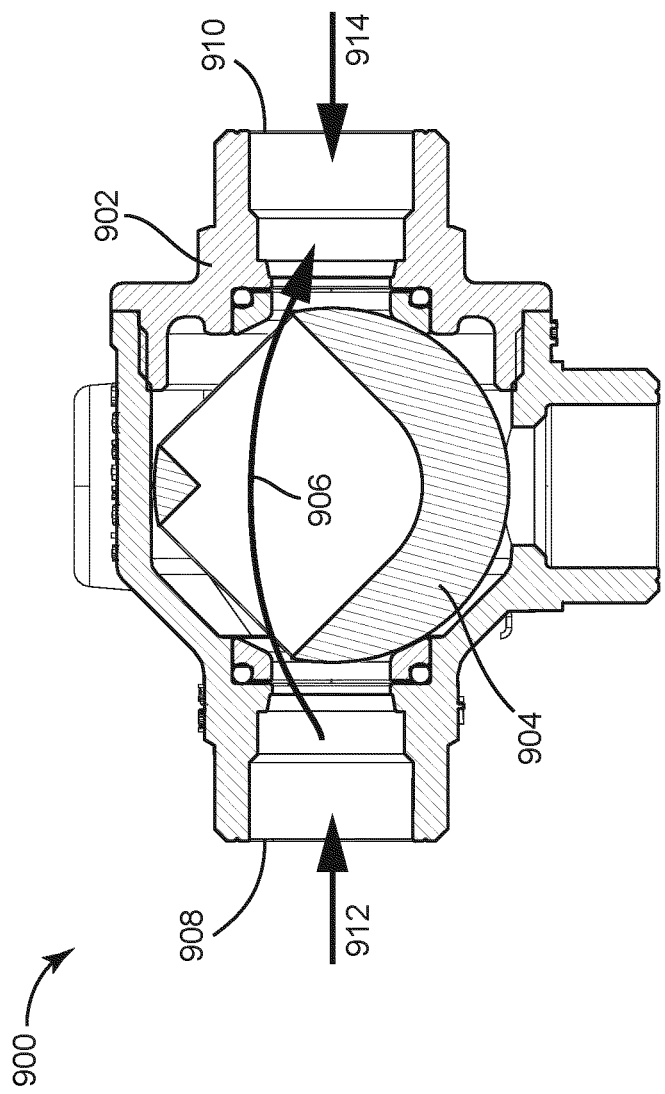
FIG. 9 is a top cross-sectional view of the valve of FIG. 1, according to some embodiments.

Referring now to FIG. 9, a cross-sectional view of the top valve portion of a valve assembly 900 having a valve body 902 and a valve member 904 is shown, according to an example embodiment. Specifically, FIG. 9 depicts an adverse consequence of using of a larger diameter or elongated hole in the valve member 904, which is the introduction of a flow-through condition (backflow, indicated by arrow 906). This condition occurs when one inlet (e.g., hot fluid inlet 908) is not fully closed before another inlet (e.g., cold fluid inlet 910) is begun to open. As shown, when the valve member is in a 135° rotation position transitioning from the hot fluid supply 912 to the cold fluid supply 914 (i.e., 50% of the entire stroke), flow from the hot inlet 908 is not fully shut off and is thus permitted to travel through the valve member 904 to the cold inlet 910. In this position, it would be desirable for the valve to shut off all sources of flow and prevent flow from one inlet to mix with the other inlet.

Figure 10:
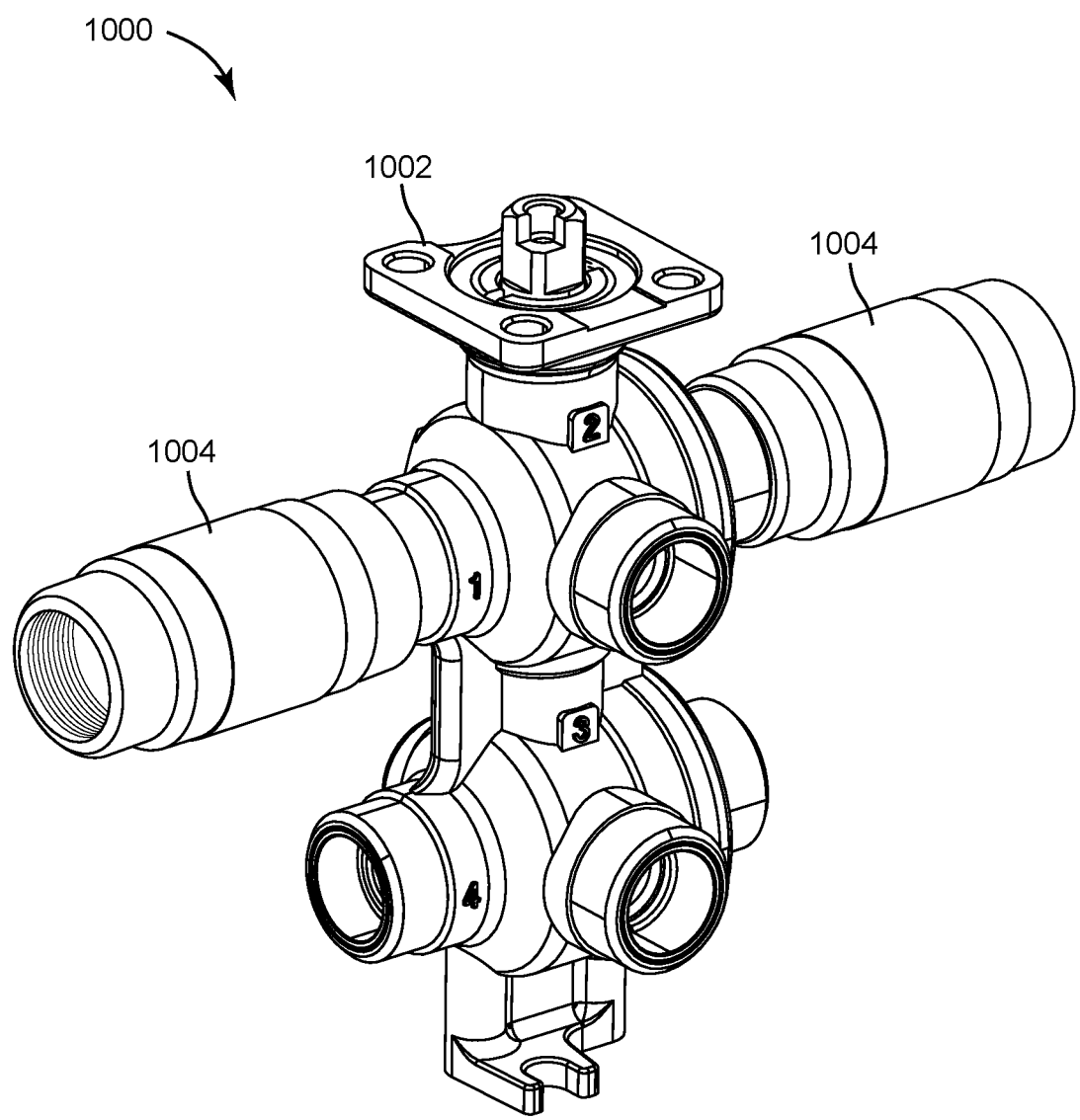
FIG. 10 is a perspective view drawing of the valve of FIG. 1 with check valves installed, according to some embodiments.

One method of solving this issue without compromising the size of the flow passage through the valve member is to add check valves, otherwise known as backflow inhibitors, in series with the inlets. FIG. 10 depicts a perspective view of a check valve assembly 1000 with a valve assembly 1002 and check valve 1004 installed on each of the hot fluid inlet port and the cold fluid inlet port. A check valve limits flow to one direction, similar to how a diode limits electrical current to one direction. The addition of a check valve 1004 on each inlet port prevents backflow, creating a no-flow condition when the valve member is positioned in the 135° rotation position.

Valve and Actuator Assembly Keying Features

FIGS. 11-15 depict various aspects of keying features intended to ensure the valve assembly and the actuator assembly are installed in the correct orientation relative to each other. FIGS. 11-14 depict, among other components, a mounting flange 1102 and a valve stem 1104 of a valve assembly 1100, and a drive stem 1302 and a mounting flange 1306 of an actuator assembly 1300. Since the drive stem 1302 of the actuator assembly 1300 is generally square shaped, there are multiple orientations in which the actuator output may be coupled to the valve stem 1104. However, in order for the actuator assembly 1300 to operate the valve stem 1104 over a full 270° stroke and align with the expected inlets and outlets, the actuator drive stem 1302 must be installed in a specific orientation relative to the valve stem 1104.

Figure 11:
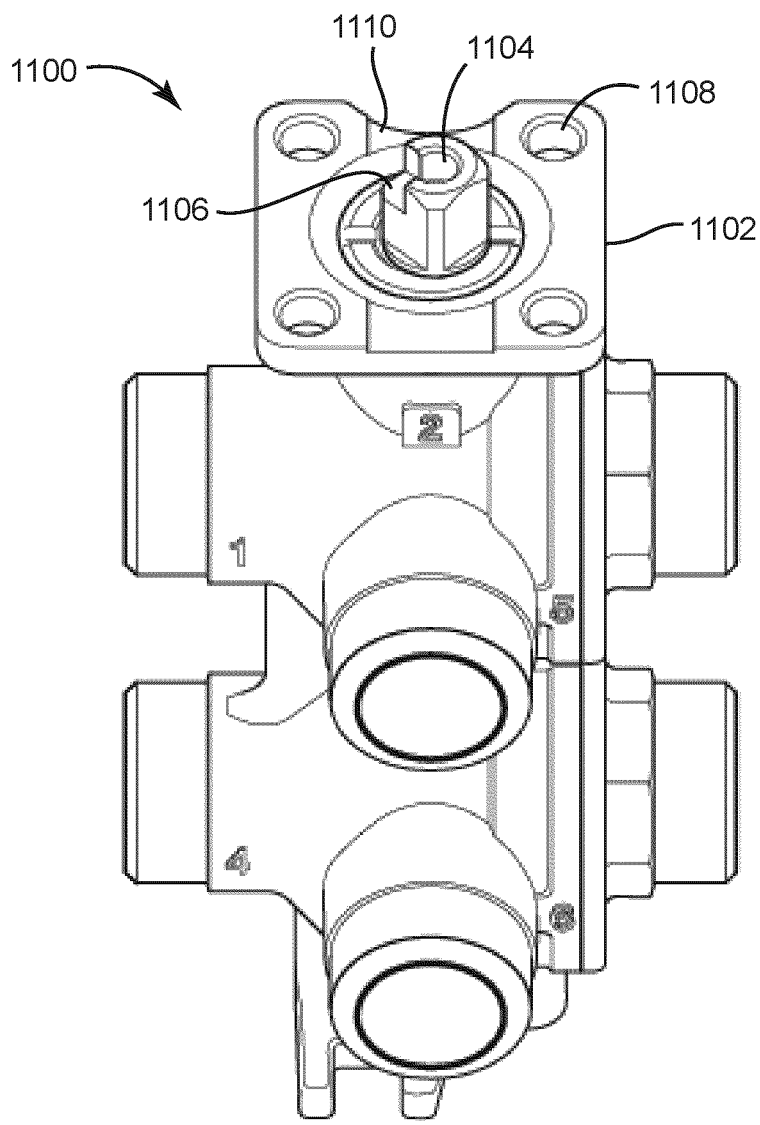
FIG. 11 is a perspective view drawing of keying feature cutouts in the valve of FIG. 1, according to some embodiments.
Figure 13:
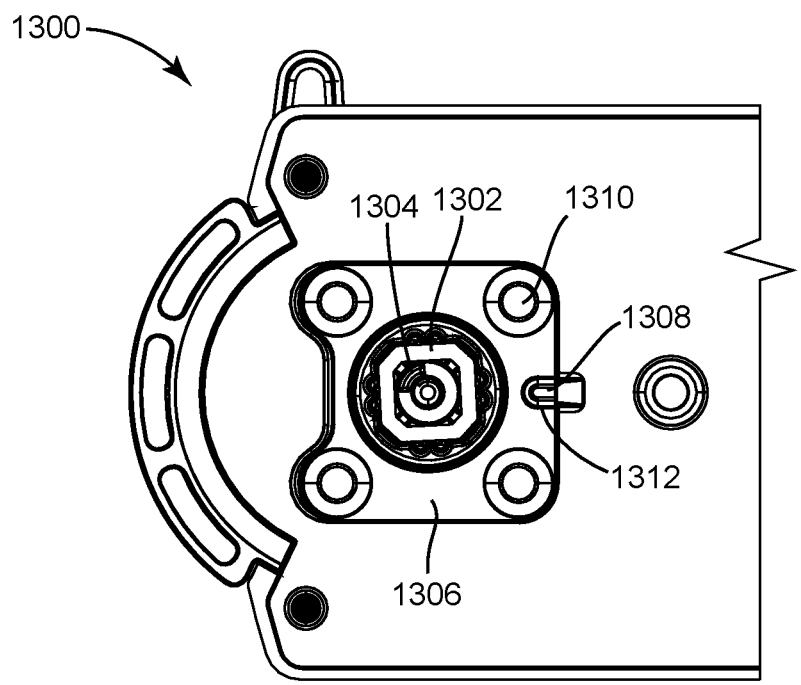
FIG. 13 is a bottom elevation view drawing of a keying feature protrusion in an actuator configured to be coupled with the valve of FIG. 1, according to some embodiments.

To ensure the correct installation orientation of these features, the valve stem 1104 and the actuator drive output 1302 may include keying features. FIG. 11 depicts a notch 1106 provided (e.g., by machining) in the valve stem 1104, while FIG. 13 depicts a protrusion 1304 included on the mounting face of the drive output 1302. In some embodiments, the valve stem 1104 also includes a counterbore to prevent a screw in the drive output from engaging the valve stem 1104 until it is below the notch 1106. When installed in an incorrect orientation, the protrusion 1304 on the actuator output prevents the valve stem 1104 from seating all the way into the actuator output 1302. When the valve stem 1104 is prevented from seating all the way into actuator output 1302, the valve and actuator may be situated far enough apart to prevent the actuator's mounting posts 1310 from engaging the corresponding holes 1108 in the valve flange. This lack of engagement between the mounting posts 1310 and the holes 1108 may serve as a visual indication that the valve stem 1104 is oriented incorrectly relative to the actuator drive output 1302.

Figure 12:
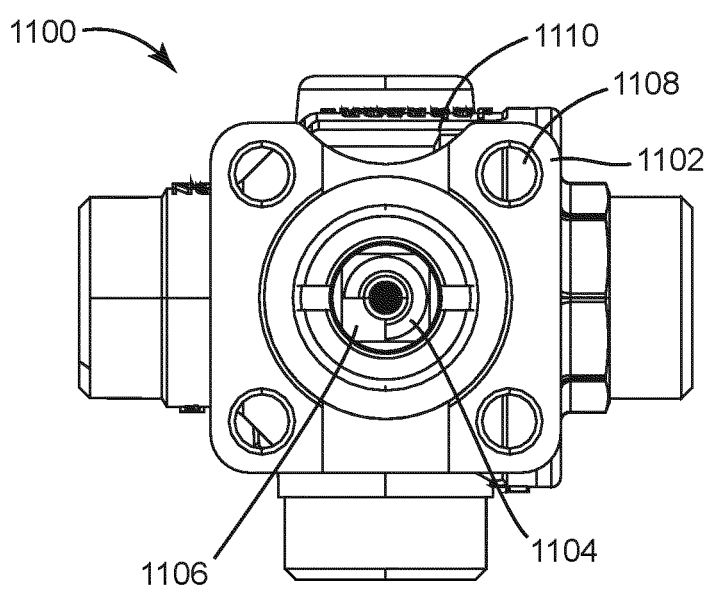
FIG. 12 is a top elevation view drawing of keying feature cutouts in the valve of FIG. 1, according to some embodiments.
Figure 14:
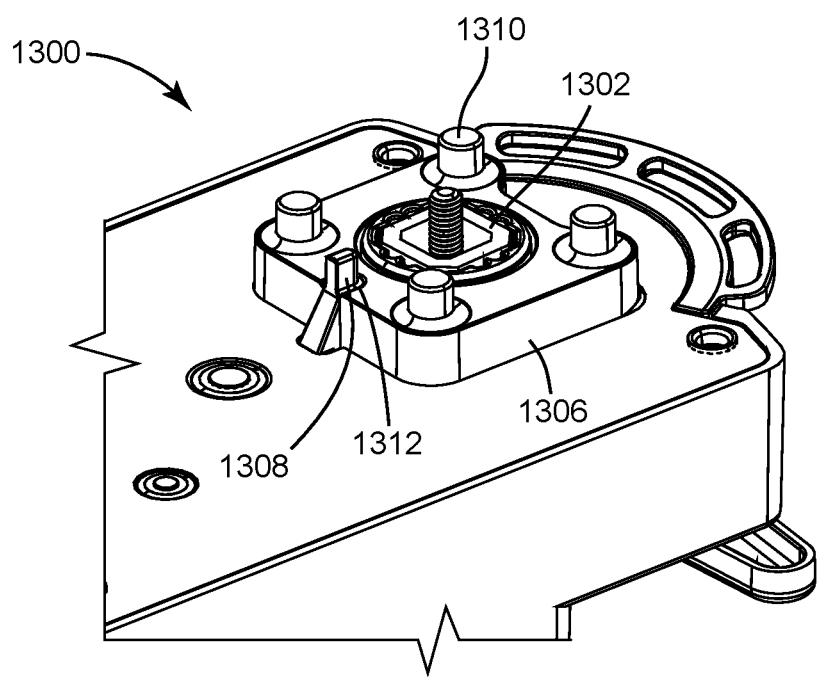
FIG. 14 is perspective view drawing of another keying feature protrusion in an actuator configured to be coupled with the valve of FIG. 1, according to some embodiments.

Turning now to FIGS. 12 and 14, additional keying features intended to ensure the correct installation orientation of the valve assembly 1100 relative to the actuator assembly 1300 are depicted, according to an exemplary embodiment. In some embodiments, the actuator assembly includes a pointer arm (described in greater detail below with reference to FIGS. 16-22) that indicates which inlet is supplying the valve assembly 1100 at a given time. To ensure the pointer arm operates as expected, the actuator assembly 1300 itself must be aligned with respect to the valve assembly 1100. Correct orientation of the actuator assembly 1300 with respect to the valve assembly 1100 may also be important to ensure an installer is afforded the greatest potential clearance for tools while assembling the system.

Figure 15:
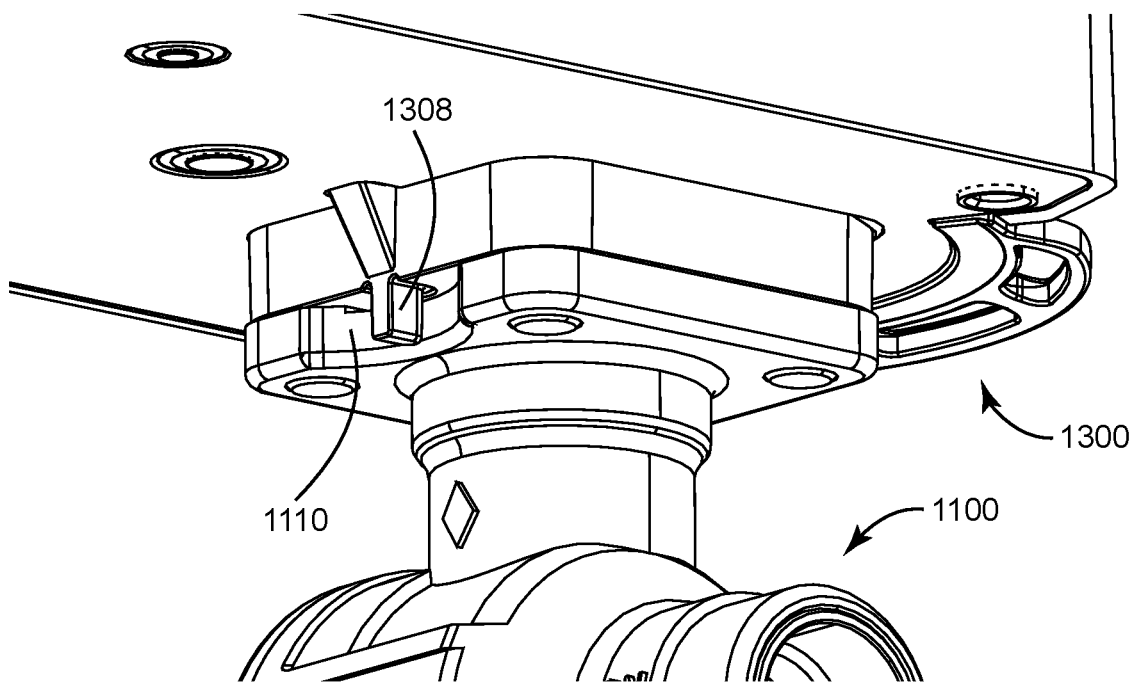
FIG. 15 is a perspective view drawing of the interaction between the keying features of an actuator and the valve of FIG. 1, according to some embodiments.
Figure 17:
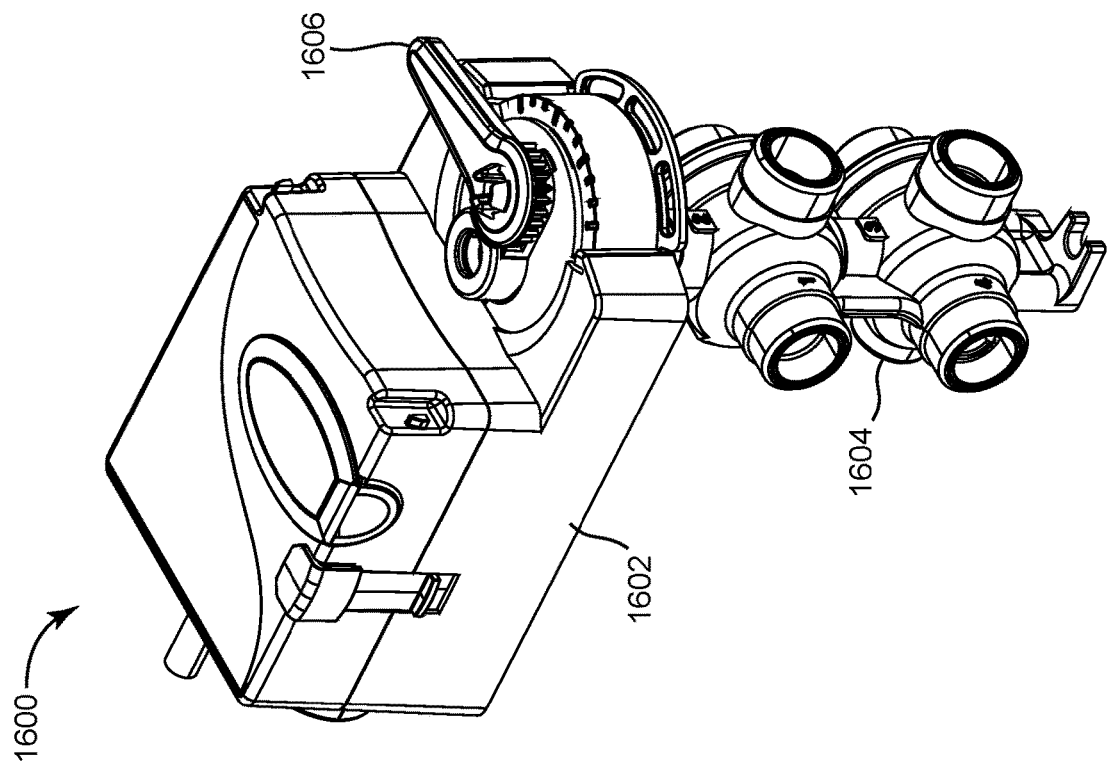
FIG. 17 is another perspective view drawing of indicator labels attached to an actuator coupled to the valve of FIG. 1, according to some embodiments.
Figure 16:
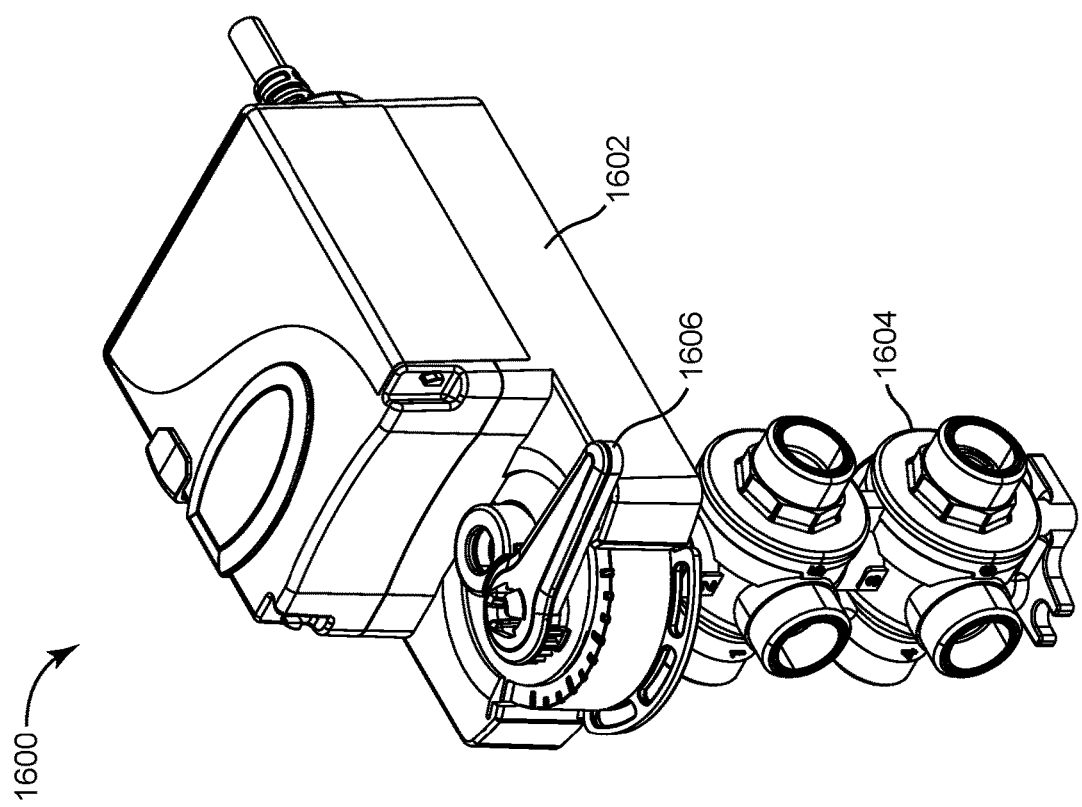
FIG. 16 is a perspective view drawing of indicator labels attached to an actuator coupled to the valve of FIG. 1, according to some embodiments.

FIG. 12 depicts a rounded cutout 1110 that may be included in mounting flange 1102 of the valve assembly 1100, while FIG. 14 depicts a corresponding tab or protrusion 1308 that may be included on the mounting flange 1306 of the actuator assembly 1300. As shown in FIG. 15, when the valve assembly 1100 is installed in the correct orientation relative to the actuator assembly 1300, the tab 1308 fits within the cutout 1100 without interference. If the components are installed incorrectly, the tab 1308 interferes with the valve mounting flange 1102. In some embodiments, the tab 1308 on the actuator 1300 includes an undercut 1312, as depicted in FIGS. 13 and 14. The undercut 1312 permits the tab 1308 to be easily snapped or cut off in a situation in which the system requires the installer to orient the actuator assembly 1300 in a different direction relative to the valve assembly 1100.

Actuator Pointer and Manual Override Handle

Turning now to FIGS. 16-22, a pointer arm 1606 installed on an actuator assembly 1602 that is used to indicate the current position of a valve assembly 1604 is shown, according to an exemplary embodiment. As depicted, the pointer arm 1606 indicates which valve inlet, if any, is open to receive a fluid supply. In some embodiments, the pointer arm 1606 also doubles as a manual override handle that may be used to move the drive shaft and valve position when power is not supplied to the actuator 1602, such as during an installation process or during a troubleshooting procedure.

Similar handles installed on valve and actuator assemblies generally rotate about the axis of rotation in the same direction as the valve stem. However, the unique nature of a 270° valve makes same rotation of the handle and the valve stem difficult to implement. Due to a lack of clearance in the area in which the handle 1606 is installed on the actuator 1602, either the handle lever arm would be too short to be useable or the shaft of the handle would need to be excessively long to bring the handle above the highest point of the actuator in the handle's path of travel.

Figure 19:
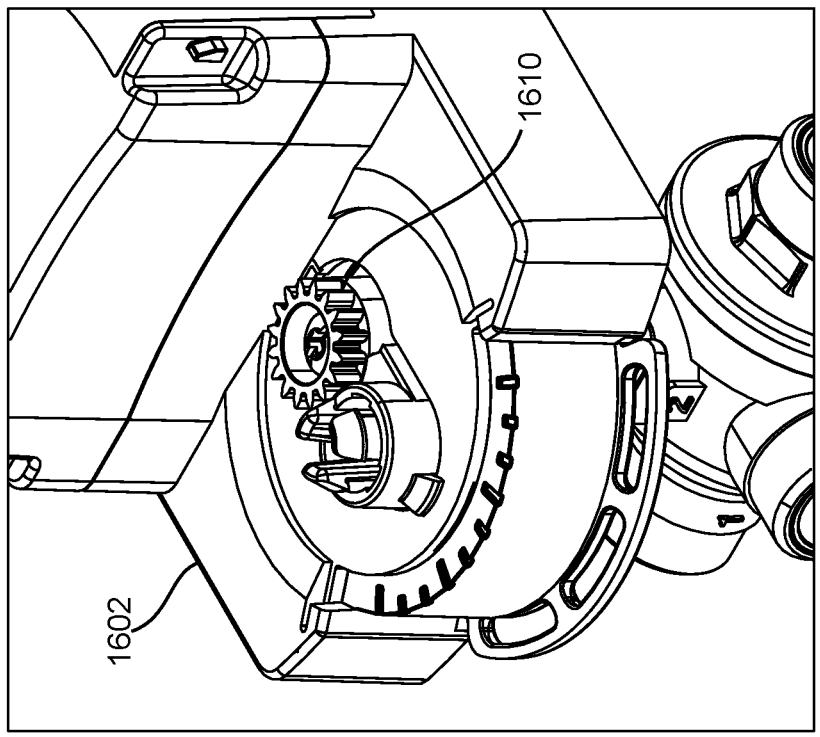
FIG. 19 is a perspective view drawing of the geared drive shaft of an actuator coupled to the valve of FIG. 1, according to some embodiments.
Figure 18:
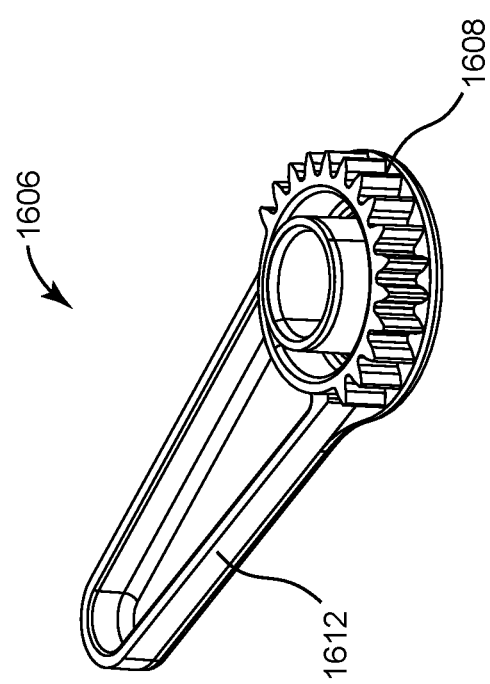
FIG. 18 is a perspective view drawing of a manual override handle, according to some embodiments.

To overcome these issues, as depicted in FIGS. 18 and 19, the pointer handle 1606 includes a set of gear teeth 1608 at a ratio of 2:3 with respect to the gear teeth 1610 located on the output shaft of the actuator 1602. This gear ratio allows the handle 1606 to rotate 180° while the output shaft rotates 270° about a common axis of rotation but in the opposite direction, permitting the valve member to travel its entire range of motion switching from the hot fluid inlet fully open to the cold fluid inlet fully open, and vice versa. Specifically referring to FIG. 18, the pointer handle 1606 (shown upside-down relative to its installation orientation) has a ledge 1612 to stop dust and debris from settling in the gearing mechanism when mounted upright. The handle 1606 mates with gear teeth 1610 on the output shaft of the actuator 1602, specifically depicted in FIG. 19. In some embodiments, the gears 1608 and 1610 are complete spur gears, with a tooth count of 24 (for the shaft) and 16 (for the handle), resulting in the gear ratio stated above.

FIGS. 20-22 depict the orientations of the pointer handle 1606 and a valve member 1614 located within the valve assembly 1604 as the pointer handle 1606 travels its entire 180° range of motion. As shown, FIG. 20 depicts the pointer handle 1606 in a 0° orientation. In this orientation, the cold fluid inlet of the valve assembly 1604 is fully open. In FIG. 21, the handle 1606 is in a 90° orientation while the valve member 1614 is in a 135° orientation, and both the cold fluid inlet and the hot fluid inlet are fully closed. Referring now to FIG. 22, the handle 1606 and the valve member 1614 reach respectively terminal positions at a 180° orientation and a 270° orientation, and the hot fluid inlet is fully open.

Actuator Indicator Labels

FIGS. 20-22 also depict images of labels 1616 and 1618 that may be applied to the actuator assembly 1602 to indicate the locations of the cold fluid inlet/outlet and the hot fluid inlet/outlet, according to an exemplary embodiment. In some embodiments, a red label (e.g., label 1618) may be utilized to indicate the hot fluid inlet/outlet, while a blue label (e.g., label 1616) may be utilized to indicate the cold fluid inlet/outlet. In other embodiments, the labels 1616 and 1618 may be different colors, or may include text. In still further embodiments, the labels 1616 and 1618 may be applied on several sides of the actuator 1602 in situations with tight-access or locations where visual access to the actuator 1602 is obscured, such as when it is installed near a ceiling.

Multipurpose Valve Tool

FIGS. 23-33 depict exemplary embodiments of flow control discs 2302, a retention ring 2304 used to retain the flow control discs 2302, and a valve key 2306 that may be utilized to install the flow control discs 2302 within a valve assembly. In some embodiments, the flow control discs 2302, the retention ring 2304, and the valve key 2306 may be molded (e.g., via a plastic injection molding process) as a single multipurpose valve tool 2300, resulting in minimal material waste. Each of the flow control discs 2302 has a unique central bore diameter, and thus, installation of a flow control disc 2302 can be used to modulate the amount of water passing through the system. In various embodiments, the flow discs 2302 may include recessed regions with flow coefficient indicators expressed in both metric units (i.e., cubic meters per hour of water at a temperature of 16° C. and a pressure drop across the valve of one bar, abbreviated Kv) and imperial units (i.e., US gallons per minute of water at a temperature of 60° F. and a pressure drop across the valve of one pound per square inch (psi), abbreviated Cv) to inform an installer of the expected flow rate that can be achieved by use of the flow control disc 2302 when the water flowing through the valve is at a specified temperature and pressure drop.

As shown in FIG. 24, which depicts a top cross-sectional view of the lower chamber of a valve 2400, flow control discs 2302 may be installed in the outlets 2408 and 2410 of the cold and/or hot water valve to restrict the flow received at the valve body 2402 by the return port 2406. In some embodiments, flow control discs 2302 are retained within the outlets 2408 and 2410 proximate the ball member 2404 via retention fasteners 2412. The installation of flow control discs 2302 and the retention fasteners 2412 is described in greater detail with respect to FIGS. 31 and 32 below.

In some embodiments, the system implementing the valve may be designed such that the flow rates for the hot fluid and cold fluid are not equal, necessitating use of flow control discs 2302 having different flow coefficients. Once valve assemblies have been installed in a system, the customer (e.g., building owner, system engineer) may wish or need to keep track of the flow control discs 2302 both in use and not in use. Additionally, actuators and valves may be mounted at different times and by different installers. In some instances, extra flow control discs 2302 are discarded, which makes modifications and retrofitted solutions troublesome. Therefore, it is advantageous to provide a means to store flow control discs 2302 on a component of the valve assembly (e.g., the actuator, the valve body) itself. Retention ring 2304 provides a means to store flow control discs 2302 and is shown to include a substantially U-shaped portion that terminates at a first curved end and a second curved end. The first curved end and the second curved end are configured to be intertwined after the flow control discs 2302 are threaded onto the U-shaped portion of the retention ring 2304 via their central bores, shown in further detail with respect to FIGS. 28-30 below.

Figure 25:
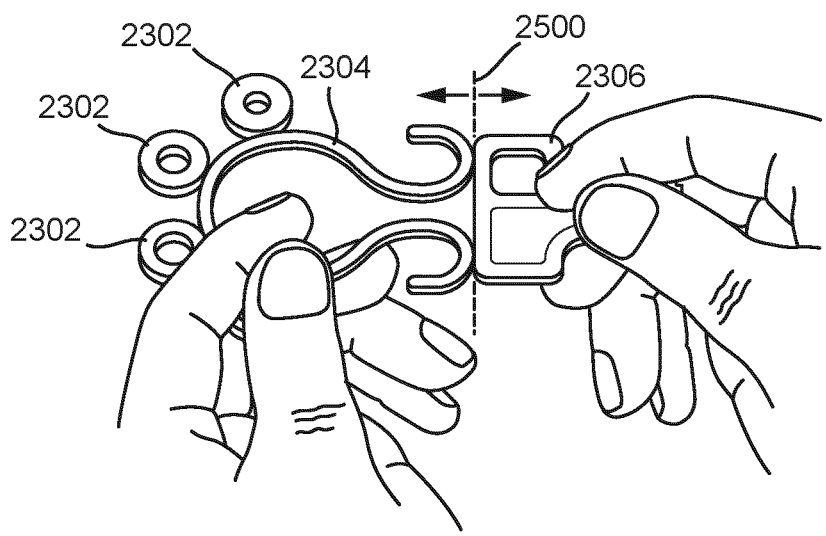
FIG. 25 is a perspective view drawing of the decoupling process for the multipurpose valve tool, according to some embodiments.
Figure 26:
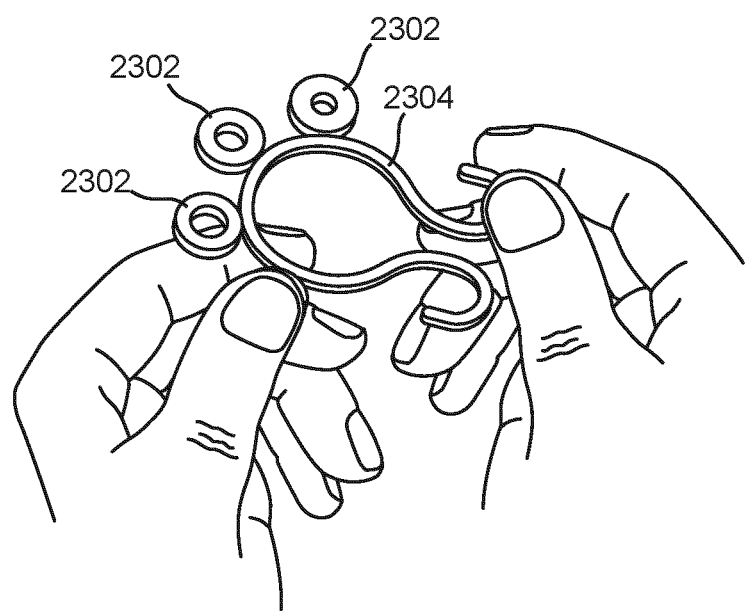
FIG. 26 is another perspective view drawing of the decoupling process for the multipurpose valve tool, according to some embodiments.
Figure 27:
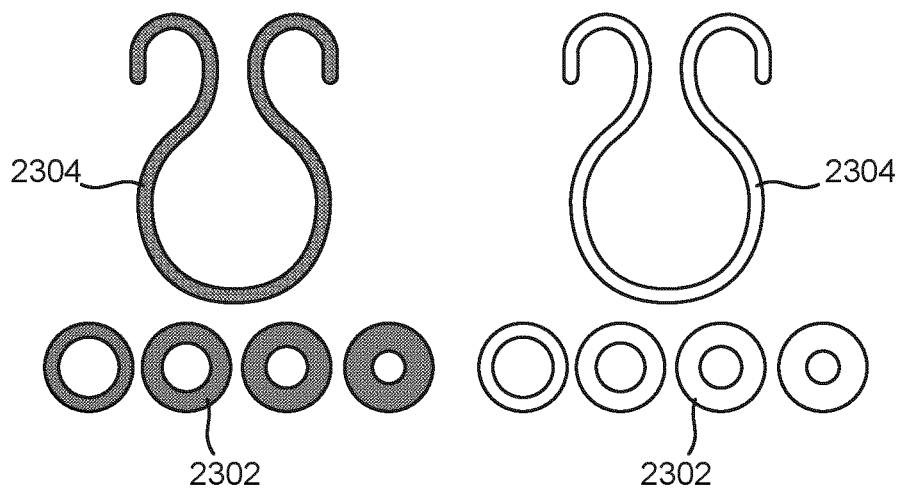
FIG. 27 is a front elevation view drawing of retention rings and flow limiting discs, according to some embodiments.

As shown in FIGS. 25-27, the components of multipurpose tool 2300, if fabricated as a single part, can be easily detached into the separate flow control discs 2302, the retention ring 2304, and the valve key 2306. FIG. 25 depicts the step of removing the valve key 2306 from the retention ring 2304 and flow control discs 2302 via separation line 2500. For example, separation of valve key 2306 from retention ring 2304 may be achieved by moving the valve key 2306 relative to the retention ring 2304 using bending or twisting motions directed along line 2500. Similarly, FIG. 26 depicts the step of separating the flow control discs 2302 from the retention ring 2304. Separation of the flow control discs 2302 from the retention ring 2304 may also be achieved via bending or twisting motions. FIG. 27 depicts the flow control discs 2302 as fully separated from the retention ring 2304. As shown, in some embodiments, the multipurpose tool 2300 (and subsequently, the flow control discs 2302, retention ring 2304, and valve key 2306) may be colored to designate the installation location for the flow control discs 2302. For example, the multipurpose tool 2300 containing flow control discs 2302 intended into to be inserted into the cold fluid outlet may be colored blue, and the multipurpose tool 2300 containing flow control discs 2302 intended to be inserted into the hot fluid outlet may be colored red.

Referring now to FIGS. 28-30, the steps of installing the retention ring 2304 on a component of the valve assembly are depicted, according to some embodiments. FIG. 28 depicts the step of threading one of the curved ends of the retention ring 2304 through an aperture 2802 on the actuator 2800 after threading the flow control discs 2302 and, if desired, the valve key 2306 onto the substantially U-shaped portion of the retention ring 2304. FIG. 29 depicts the curved ends of the retention ring 2304 intertwined or looped around each other in order to retain the retention ring 2304 on the actuator 2800. In other embodiments, the retention ring 2304 may be threaded through and retained on an aperture in a valve assembly. FIG. 30 depicts multiple retention rings 2304, each with flow control discs 2302 and valve key 2306, retained on an actuator 2800, according to an exemplary embodiment.

Referring now to FIGS. 31 and 32, steps in the process of installing a flow control disc 2302 within an outlet port 3102 of a valve body 3100 are shown, according to some embodiments. As shown, valve key 2306 includes a first end 2310 shaped to engage with an installation feature in retention fastener 2412 for flow control disc 2302. In some embodiments, the installation feature is a slot or recess on the face of the retention fastener 2412, and the first end 2310 is substantially cross-shaped. FIG. 32 depicts the process of driving the retention fastener 2412 into a fully seated position within the outlet port 3102 through rotation of the valve key 2306. In various embodiments, the retention fastener 2412 has a threaded outer diameter portion, and the threaded outer diameter portion is configured to threadably couple to the outlet port 3102.

FIG. 33 depicts the use of the valve key 2306 to manually actuate the valve member of a valve assembly, according to some embodiments. As shown, valve key 2306 includes a substantially square cutout 2308 opposite the first end 2310. The cutout 2308 may be any size or shape required to engage with the end of a valve stem (e.g., the square-shaped valve stem of valve member 116) to act as a wrench and rotate the valve stem into the correct orientation for assembly with a valve actuator. For example, alignment of keying features in the valve stem and valve actuator may be required to assemble the valve to the valve actuator. Thus, in some embodiments, certain features of the valve key 2306 (e.g., length, thickness) may be selected to withstand the torque required to rotate the valve stem.

Actuator Equal Percentage Flow Algorithm

Figure 34:
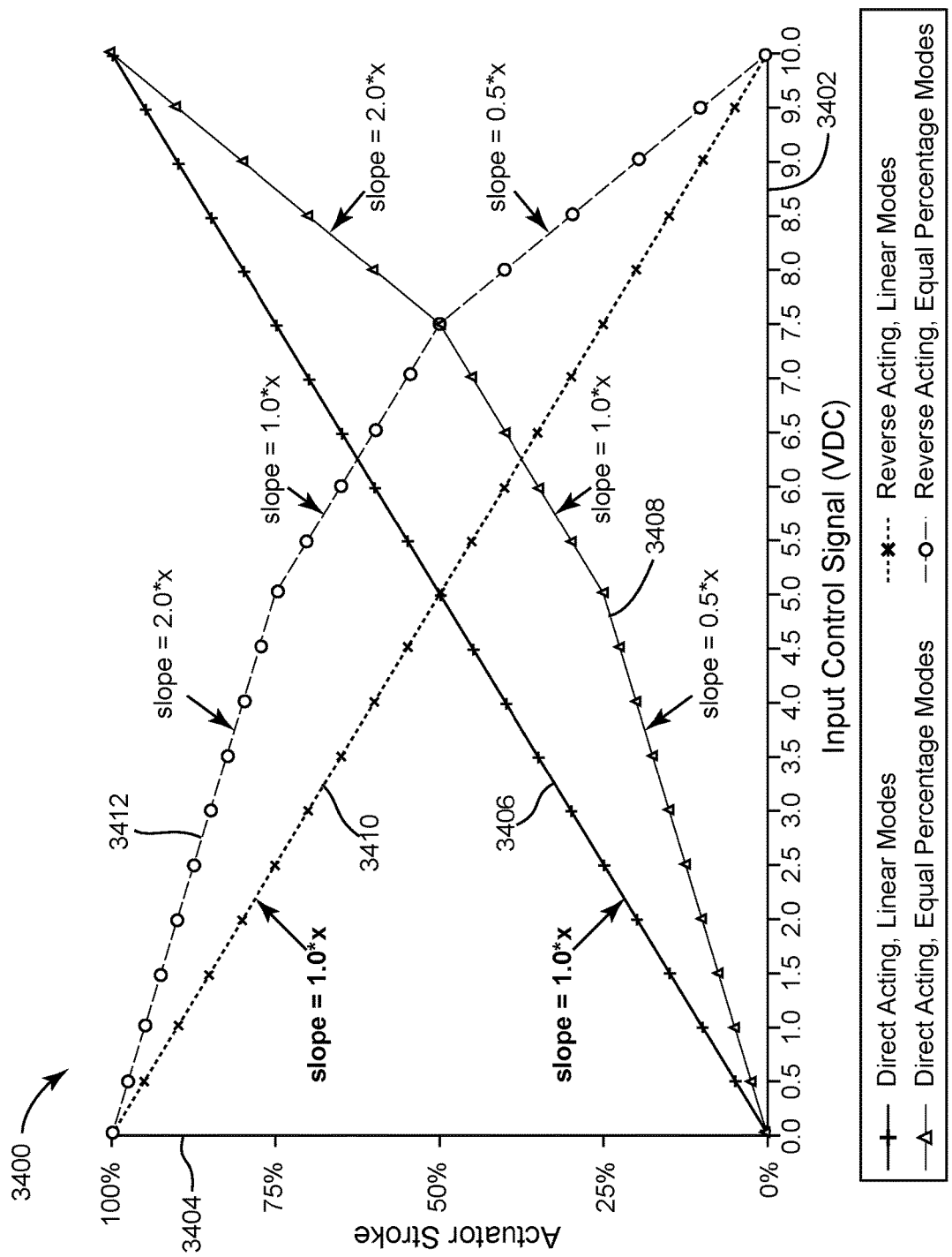
FIG. 34 is a graph illustrating an implementation of an equal percentage flow algorithm, according to some embodiments.

Referring now to FIG. 34, a graph 3400 depicting an implementation of an equal percentage flow algorithm is shown, according to an exemplary embodiment. The equal percentage flow algorithm may be utilized to modify a actuator control signal such that the flow rate through a valve assembly is proportional to the control signal. For example, under existing methods, if a valve actuator receives a command of 5 VDC, and the actuator is configured to receive control signals in the range of 0-10 VDC, the actuator will drive the output hub to a half open position. However, the geometry of the valve assembly ball member and the flow passage results in a nonlinear relationship between the stroke of the actuator and the flow rate achieved by the valve assembly. In other words, rotating the valve member to a 50% open position does not result in twice the flow rate of the 25% open position. In order to create a linear relationship between the valve member position (governed by the linear control mode command signal) and the flow rate, an equal percentage flow algorithm is used. When the equal percentage flow algorithm is implemented, for example, a 5 VDC linear control mode command signal may result in the actuator driving the output hub to a 65% open position, rather than a 50% open position, in order to reach the desired flow rate through the valve.

In some embodiments, an equal percentage flow algorithm is implemented by a system identical or substantially similar to valve control system 600, described above with reference to FIG. 6. For example, an actuator controller (e.g., controller 602) receives a linear control mode command signal of 0-10 VDC. In some embodiments, the linear control mode command signal is received from a supervisory controller (e.g., supervisory controller 614). In response, the actuator controller is configured to determine equal percentage mode signal used to drive the actuator output hub to a position that results in a flow rate in direct proportion to the linear control mode signal. Put simply, implementation of the equal percentage flow algorithm converts a linear control mode signal configured to drive an actuator to a first setpoint into an equal percentage mode signal configured to drive the actuator to a second setpoint.

Implementation of an equal percentage flow algorithm may be accomplished in several ways. The first method involves breaking the output stroke into segments characterized by several equations over the range of the stroke. FIG. 34 depicts an implementation of this method in the form of a graph of the relationship between the input control signal (represented along the x-axis 3402) and the actuator stroke (represented along the y-axis 3404). As shown, graph 3400 includes plots 3406 and 3410 of linear control mode signals for both a direct acting and a reverse acting actuator. In contrast to the linear operating modes 3406 and 3410, the actuator controller may convert the linear operating controls signals to operate the actuator according to equal percentage modes 3408 and 3412 in which the actuator stroke varies non-linearly over the range of the 0-10 VDC input signal. As shown, the slope of the equal percentage mode control signals 3408 and 3412 ranges from 0.5 to 2, however, in other embodiments, the slope and order of the equation or equations for the equal percentage mode control signal may vary according to the characteristics of the valve assembly. In various embodiments, conversion of the linear control mode signal into an equal percentage mode signal involves the use of a look up table to retrieve one or more relevant equations to complete the conversion. In some embodiments, the equations used to convert the linear control mode signal into the equal percentage mode signal are nonlinear.

In some embodiments, the actuator controller (e.g., memory 610 of controller 602) may store multiple equations used to convert the linear control mode signal to the equal percentage mode signal depending upon the type and size of valve attached to the actuator. For example, the dimensions of the fluid passage through the valve member (e.g., cross-sectional area, height, width) may directly affect the relationship between the position of the valve member and the flow rate through the valve assembly. In other embodiments, a valve installer or technician enables a certain equation or equations through jumpers or through a dual in-line package (DIP) switch setting located on the body of the actuator. In still further embodiments, the installer or technician selects a certain equation or equations through a user interface on the actuator or a control mechanism consisting of push buttons and LEDs.

Overpressure Protection and Leakage Path

FIG. 35 depicts a series of cross-sectional views of the upper and lower chambers of a valve assembly as the valve ball members are in the 90° and 180° positions of the full 270° valve rotation. Valve body 3500 is shown to include an upper valve chamber with an upper valve member 3502 and a lower valve chamber with a lower valve member 3504. Both valve members 3502 and 3504 are shown to include substantially L-shaped fluid passages. The upper valve chamber is further shown to include a first upper port 3506, a second upper port 3508, and a third upper port 3510. The lower valve chamber includes a first lower port 3512, a second lower port 3514, and a third lower port 3516. In various embodiments, the first upper port 3506, the second upper port 3508, and the third lower port 3516 function as inlets to the valve body 3500, while the third upper port 3510, the first lower port 3512, and the second lower port 3514 function as outlets to the valve body 3500. A first gasket 3524 may located between the first lower port 3512 and the second lower port 3514, while a second gasket 3526 may be located concentric to the third lower port 3516.

One difference between the design of the upper and lower valve chambers involves the lack of upper valve gaskets surrounding the valve outlet and the passage opposite the outlet. The absence of gaskets in the upper valve chamber provides overpressure protection and a leakage path for the outlet. When an overpressure condition occurs, the lack of gaskets provides space for excess fluid to flow back around the ball member 3502 and into the inlet ports 3512 and 3514. For example, fluid may flow back around the upper valve member 3502 and into the cold inlet 3506 when the valve member is in a 90° orientation, and back into the hot inlet 3508 when the valve member is in a 180° orientation.

Valve Assembly Components

Figure 36:
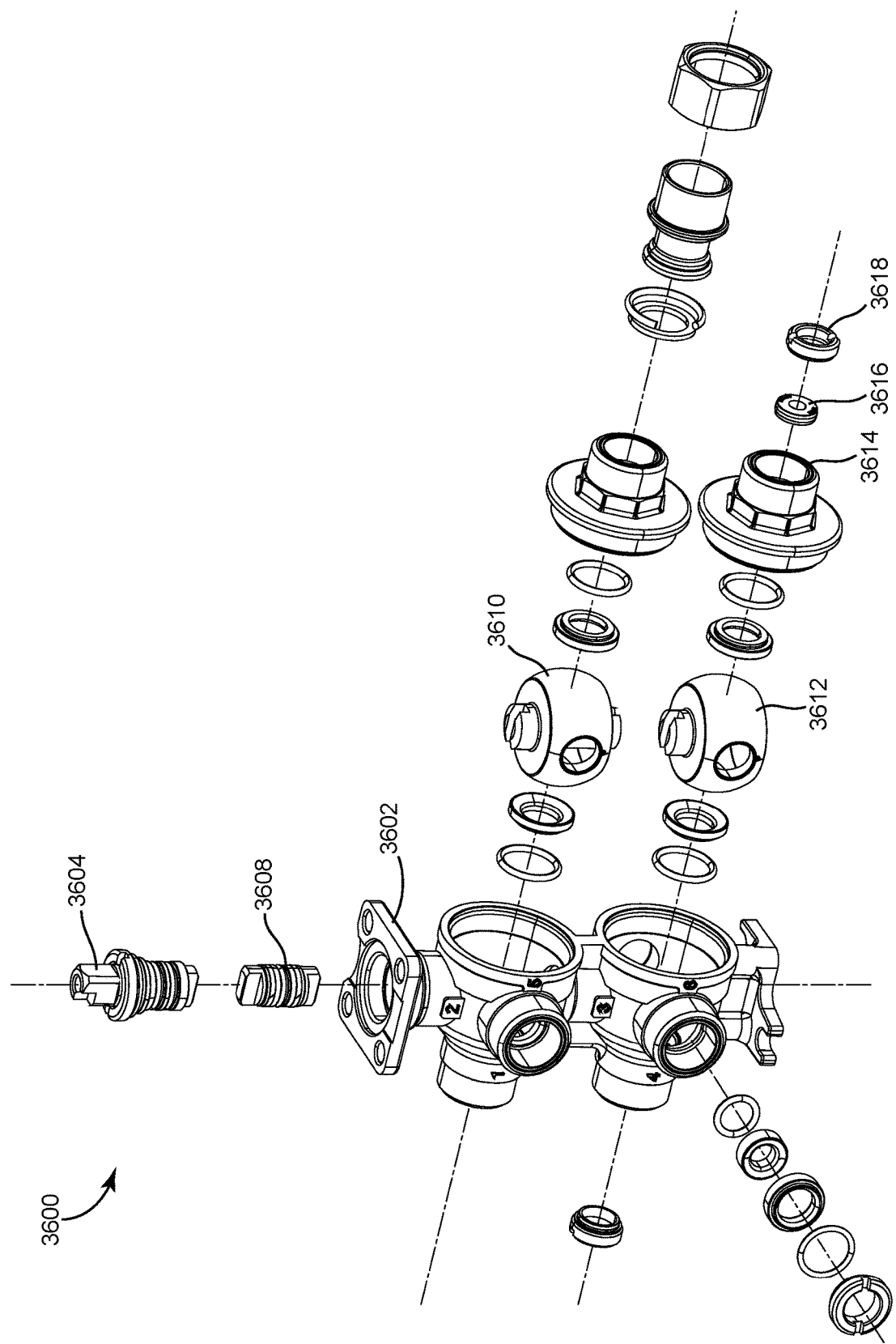
FIG. 36 is an exploded perspective view drawing of a valve assembly, according to some embodiments.
Figure 37:
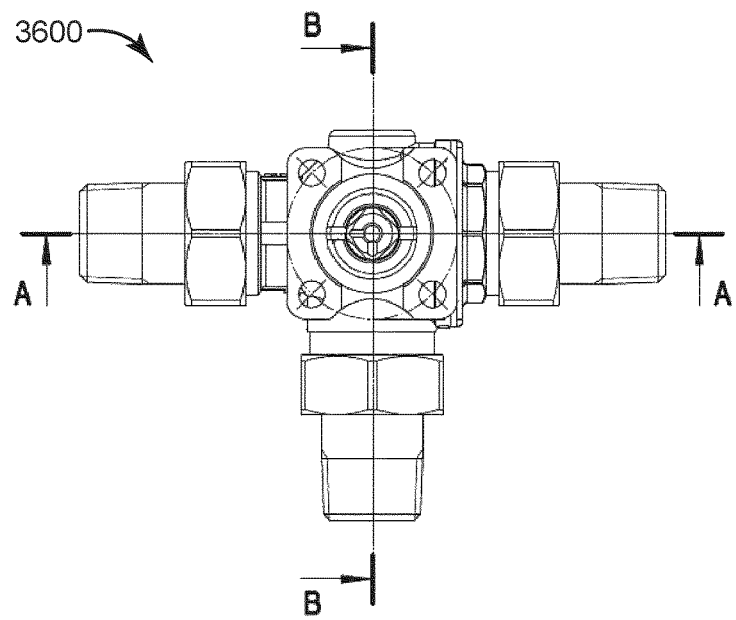
FIG. 37 is a top elevation view drawing of the valve assembly of FIG. 36, according to some embodiments.
Figure 38:
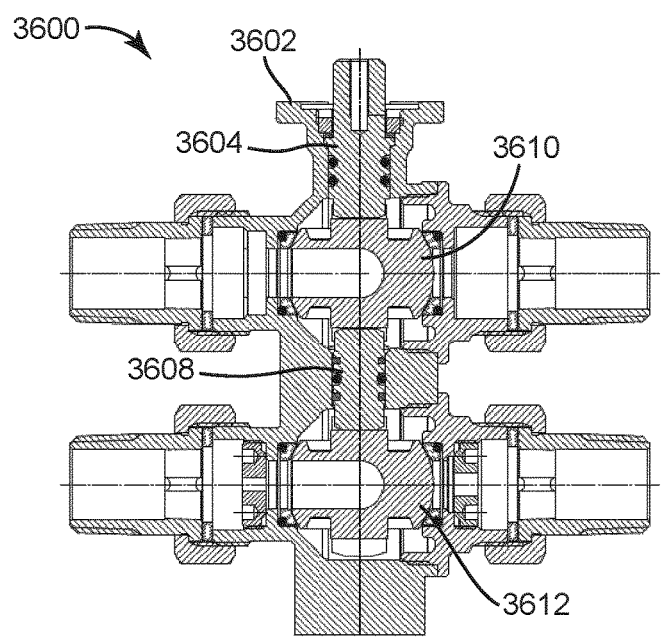
FIG. 38 is a front sectional view drawing of the valve assembly of FIG. 37 along line A-A, according to some embodiments.
Figure 39:
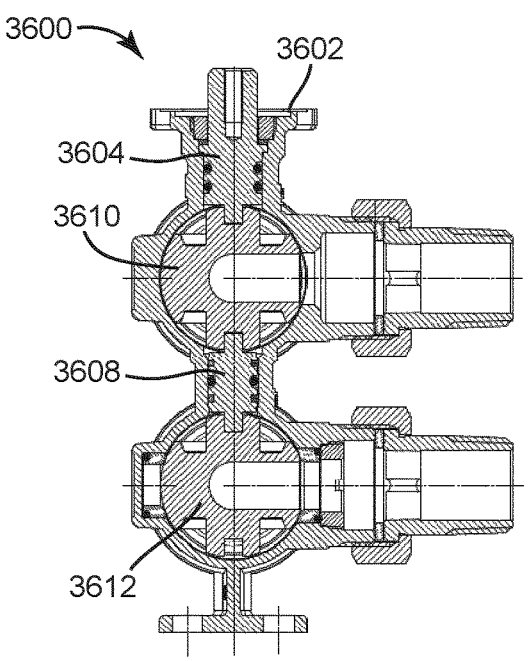
FIG. 39 is a side sectional view drawing of the valve assembly of FIG. 37 along line B-B, according to some embodiments.
Figure 40:
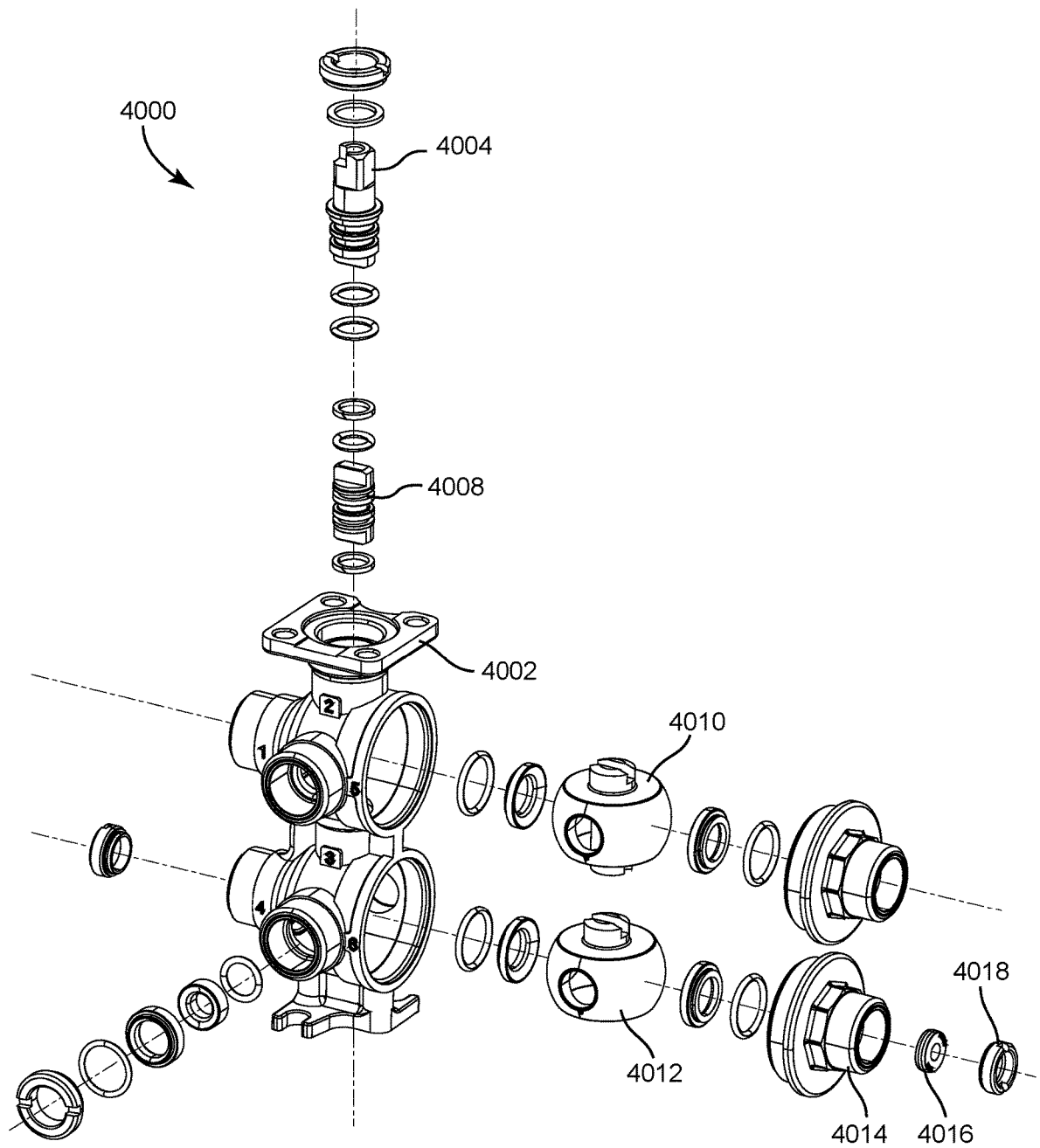
FIG. 40 is an exploded perspective view drawing of another valve assembly, according to some embodiments.
Figure 41:
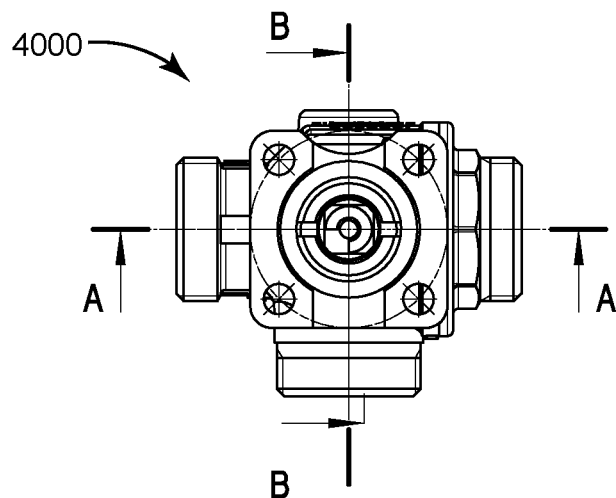
FIG. 41 is a top elevation view drawing of the valve assembly of FIG. 40, according to some embodiments.

FIGS. 36-43 depict various aspects of valve assemblies 3600 and 4000, according to some embodiments. FIGS. 36 and 41 depict exploded view drawings of exemplary valve assemblies. Referring specifically to FIG. 36, valve assembly 3600 is shown to include, among other components, a valve body 3602, a first valve stem component 3604, and a second valve stem component 3608. First valve stem component 3604 may be coupled to upper chamber ball valve member 3610 and second valve stem component 3608 may be situated between and coupled to both upper chamber ball valve member 3610 and lower chamber ball valve member 3612. As described above, the ball valve members 3610 and 3612 may include one or more flattened surfaces rather than a fully spherical shape in order to minimize the overall height of the valve assembly. FIG. 36 additionally depicts the orientation of a flow control disc 3616 that is installed within an outlet port 3614. In various embodiments, flow control disc 3616 is retained within outlet port 3614 via retention fastener 3618. As described above with reference to FIGS. 31 and 32, the retention fastener 3618 includes features (e.g., a recess on the face of the retention fastener) configured to engage with a valve key to aid in the installation process.

Referring now to FIG. 40, valve assembly 4000 is similarly shown to include, among other components, a valve body 4002, a first valve stem component 4004, a second valve stem component 4008, an upper chamber ball valve member 4010, and a lower chamber ball valve member 4012. In contrast to valve assembly 3600, instead of having L-shaped flow passages, both ball valve members 4010 and 4012 are substantially hollow with flow openings disposed approximately 90° apart. Valve assembly 4000 is further shown to include a flow control disc 4016 that is installed within 4014 and retained via retention fastener 4018.

Figure 42:
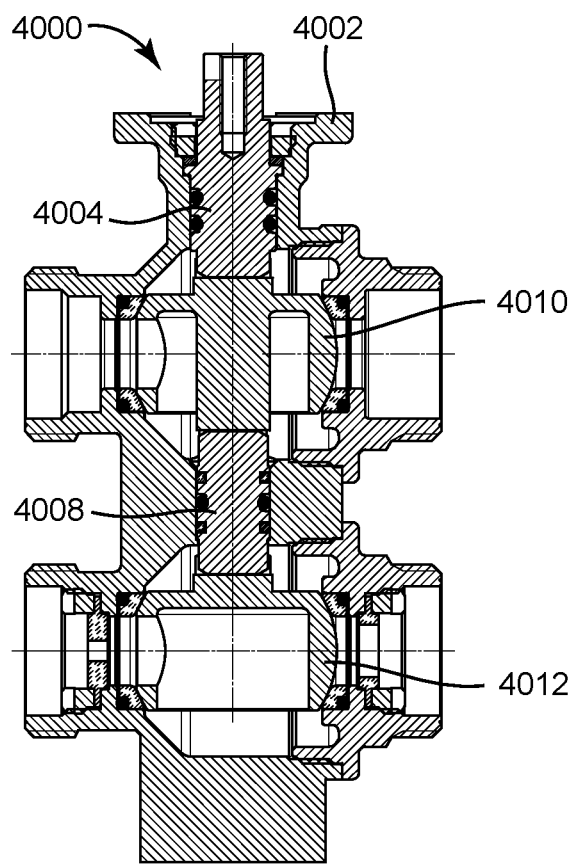
FIG. 42 is a front sectional view drawing of the valve assembly of FIG. 40 along line A-A, according to some embodiments.
Figure 43:
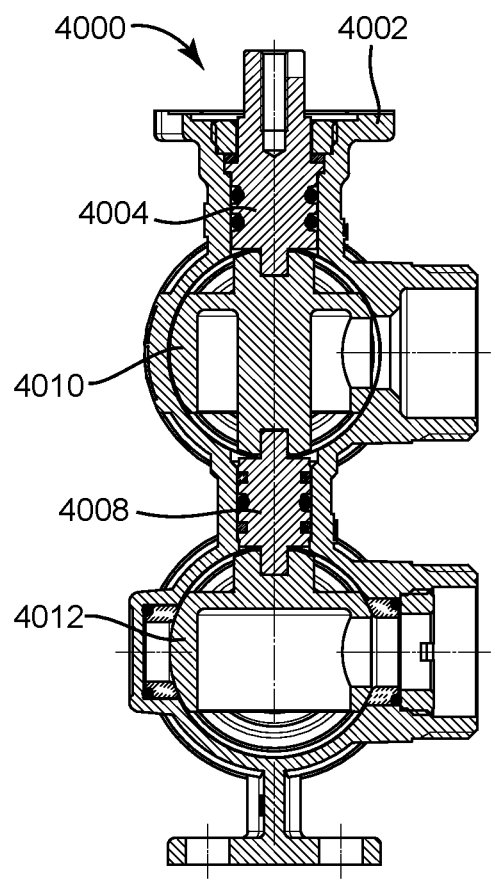
FIG. 43 is a side sectional view drawing of the valve assembly of FIG. 40 along line B-B, according to some embodiments.

FIGS. 37-39 and 41-43 depict elevation and sectional views of the valve assemblies depicted in FIGS. 36 and 40, respectively. As described above, FIGS. 38-39 depict sectional views A-A and B-B of valve assembly 3600 including ball members 3610 and 3612 with L-shaped flow passages of a constant cross-sectional area. First valve stem component 3604 is coupled to the upper chamber ball valve member 3610 and includes an end that protrudes from the valve body 3602. Second valve stem component 3608 is coupled to both the upper chamber ball valve member 3610 and the lower chamber ball valve member 3612. FIGS. 42 and 43 depict sectional views A-A and B-B of valve assembly 4000. Unlike the ball members of valve 3600, upper chamber ball valve member 4010 and lower chamber ball valve member 4012 are shown to be substantially hollow. First valve stem component 4004 is coupled to the upper chamber ball valve member 4010 and includes an end that protrudes from the valve body 4002. Second valve stem component 4008 is coupled to both the upper chamber ball valve member 4010 and the lower chamber ball valve member 4012.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for any one or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling fluid flow within an HVAC system, comprising:
   a valve assembly configured to control the flow of fluid within the HVAC system comprising:
   a valve body having a valve chamber and a plurality of ports into the valve chamber, the plurality of ports comprising a first port, a second port, and a third port, wherein the first port and the second port are aligned with a common axis and located on opposite sides of the valve chamber; and a valve member located within the valve chamber and comprising a ball having a fluid passage extending therethrough, wherein the valve member is configured to rotate approximately 270 degrees between a first end position in which the first port is fluidly connected with the third port and the second port is closed, and a second end position in which the second port is fluidly connected with the third port and the first port is closed;

an electronically-controllable actuator comprising a motor and a drive device, the drive device driven by the motor and coupled to the valve assembly for driving the valve member between the first end position and the second end position; and an electronic actuator controller comprising:

a communications interface configured to receive a linear control mode signal and to transmit an equal percentage mode signal; and a processing circuit coupled to the motor and the communications interface and configured to determine the equal percentage mode signal using an equal percentage flow algorithm, the equal percentage flow algorithm comprising at least one equation used to convert the linear control mode signal to the equal percentage mode signal, wherein the at least one equation used to convert the linear control mode signal to the equal percentage mode signal is based at least in part on a dual in-line package (DIP) switch setting on the electronically-controllable actuator;

wherein the linear control mode signal is configured to operate the motor to drive the drive device to a first actuator position setpoint, and the equal percentage mode signal is configured to operate the motor to drive the drive device to a second actuator position setpoint such that a flow rate through the valve assembly is proportional to the linear control mode signal.

2. The system of claim 1, further comprising a supervisory controller configured to transmit the linear control mode signal to the communications interface of the electronic actuator controller.

3. The system of claim 1, wherein at least one equation used to convert the linear control mode signal to the equal percentage mode signal is nonlinear.

4. The system of claim 1, wherein the processing circuit is further configured to retrieve at least one equation used to convert the linear control mode signal to the equal percentage mode signal from a lookup table.

5. The system of claim 1, wherein at least one equation used to convert the linear control mode signal to the equal percentage mode signal is based at least in part on a geometric characteristic of the valve assembly.

6. The system of claim 5, wherein the geometric characteristic is a dimension of the fluid passage extending through the valve member.

7. The system of claim 1, wherein the electronically-controllable actuator is at least one of a direct acting actuator or a reverse acting actuator.

8. The system of claim 1, wherein the linear control mode signal ranges from 0 to 10 VDC.

9. The system of claim 1, wherein the equal percentage mode signal ranges from 0 to 10 VDC.

10. The system of claim 1, wherein the processing circuit is further configured to store multiple equations used to convert the linear control mode signal to the equal percentage mode signal based on the type and size of the valve body.

11. A method for operating a valve assembly within an HVAC system, comprising:

receiving, at a communications interface of an electronic actuator controller, a linear control mode signal for an electronically-controllable actuator, the linear control mode signal configured to operate the electronically-controllable actuator to a first actuator position setpoint;

applying, by a processing circuit of the electronic actuator controller, an equal percentage flow algorithm to the linear control mode signal, the equal percentage flow algorithm comprising at least one equation used to convert the linear control mode signal to an equal percentage mode signal, wherein at least one equation used to convert the linear control mode signal to the equal percentage mode signal is based at least in part on a dual in-line package (DIP) switch setting on the electronically-controllable actuator;

transmitting, by the communications interface of the electronic actuator controller, the equal percentage mode signal to the electronically-controllable actuator, the equal percentage mode signal configured to operate the electronically-controllable actuator to a second actuator position setpoint such that a flow rate through the valve assembly is proportional to the linear control mode signal;

wherein the valve assembly is configured to control the flow of fluid within the HVAC system and comprises:

a valve body having a valve chamber and a plurality of ports into the valve chamber, the plurality of ports comprising a first port, a second port, and a third port, wherein the first port and the second port are aligned with a common axis and located on opposite sides of the valve chamber; and a valve member located within the valve chamber and comprising a ball having a fluid passage extending therethrough, wherein the valve member is configured to rotate approximately 270 degrees between a first end position in which the first port is fluidly connected with the third port and the second port is closed, and a second end position in which the second port is fluidly connected with the third port and the first port is closed.

* * * * *